(12) United States Patent
Kawabe et al.

(10) Patent No.: US 11,887,633 B2
(45) Date of Patent: Jan. 30, 2024

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Takayuki Kawabe, Sagamihara Kanagawa (JP); Akihiko Takeo, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/941,356

(22) Filed: Sep. 9, 2022

(65) Prior Publication Data
US 2023/0282228 A1    Sep. 7, 2023

(30) Foreign Application Priority Data

Mar. 1, 2022 (JP) .................... 2022-030916
Jul. 21, 2022 (JP) .................... 2022-116443

(51) Int. Cl.
| G11B 27/36 | (2006.01) |
| G11B 5/596 | (2006.01) |
| G11B 5/012 | (2006.01) |
| G11B 21/10 | (2006.01) |

(52) U.S. Cl.
CPC ............ G11B 5/012 (2013.01); G11B 21/106 (2013.01)

(58) Field of Classification Search
CPC ....... G11B 5/596; G11B 5/59627; G11B 5/09; G11B 19/04; G11B 15/04; G11B 5/58; G11B 5/59677; G11B 5/59655; G11B 5/012; G11B 2220/20; G11B 2220/90; G11B 27/3027; G11B 27/36
USPC ........ 360/75, 77.08, 77.01, 77.02, 77.04, 60
See application file for complete search history.

(56) References Cited

U.S. PATENT DOCUMENTS

| 6,657,805 B2 | 12/2003 | Nishida et al. |
| 7,245,447 B2 | 7/2007 | Zaitsu |
| 8,587,889 B2 | 11/2013 | Kawabe |
| 9,236,073 B1 | 1/2016 | Liu et al. |
| 9,767,841 B2 | 9/2017 | Haddock |
| 10,748,567 B1 * | 8/2020 | Zaitsu ............. G11B 20/10388 |
| 2012/0307400 A1 | 12/2012 | Kawabe |

FOREIGN PATENT DOCUMENTS

JP    2012-252732 A    12/2012

* cited by examiner

*Primary Examiner* — Nabil Z Hindi
(74) *Attorney, Agent, or Firm* — Allen & Overy LLP

(57) ABSTRACT

According to one embodiment, a magnetic disk device comprising a magnetic disk, a magnetic head, and a controller that registers an address and a positioning error, determines whether or not a positioning error of a second sector that is two tracks ahead in a radial direction of a first sector to which a data is written is registered, and when the positioning error of the second sector is registered, sets a first threshold that allows a write operation for a positioning error of the first sector based on the positioning error of the second sector, and determines whether or not the positioning error of the first sector exceeds the first threshold, and stops the write operation when the positioning error of the first sector exceeds the first threshold.

14 Claims, 18 Drawing Sheets

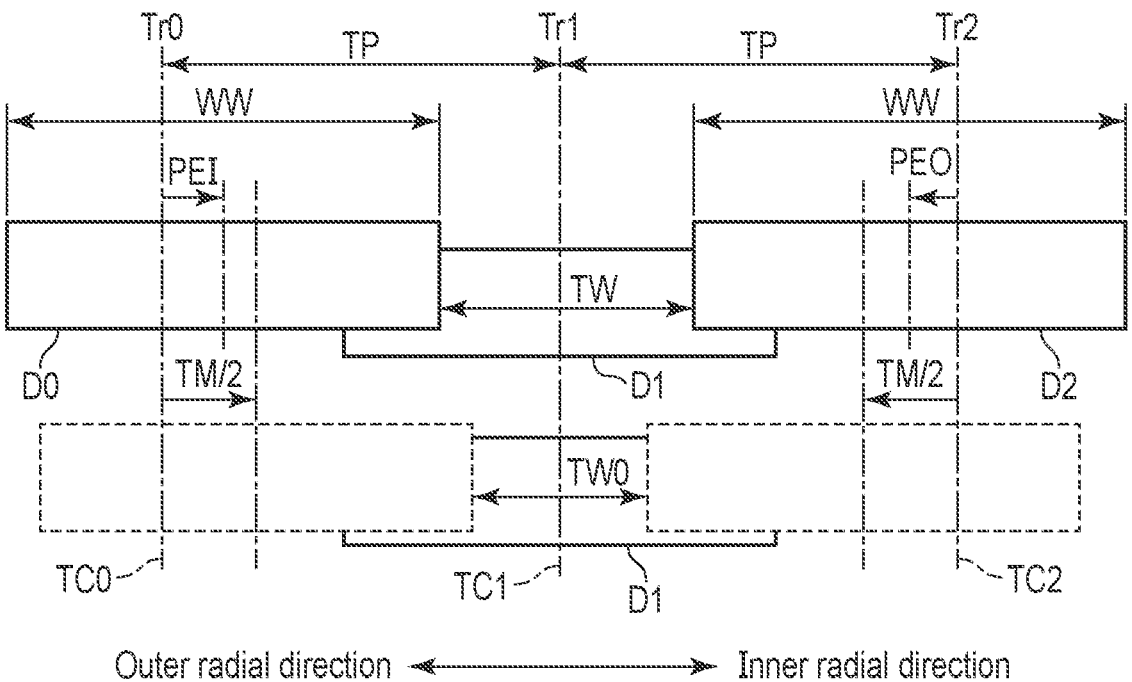
F I G. 2
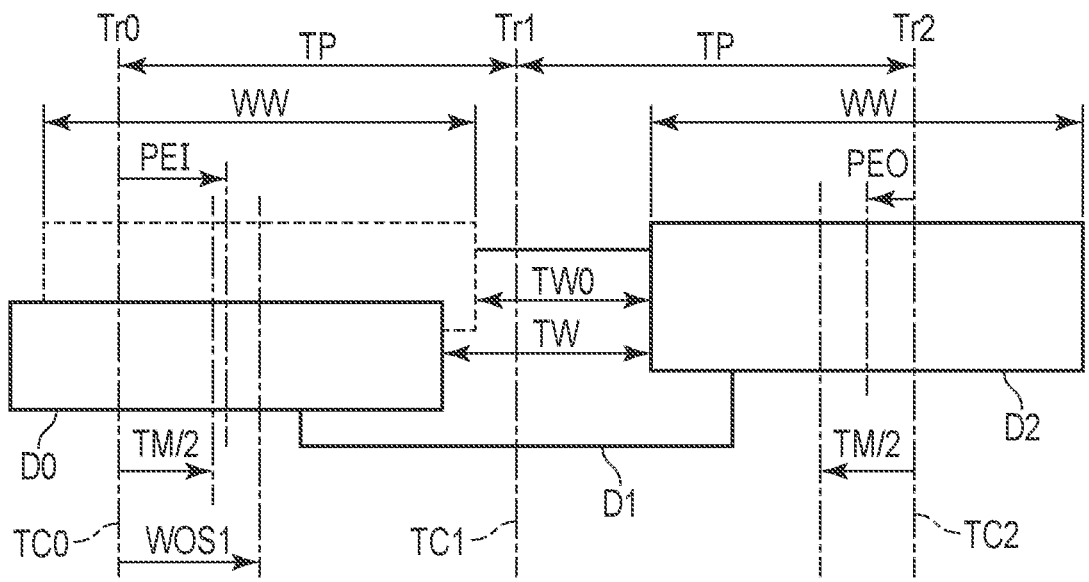
F I G. 3

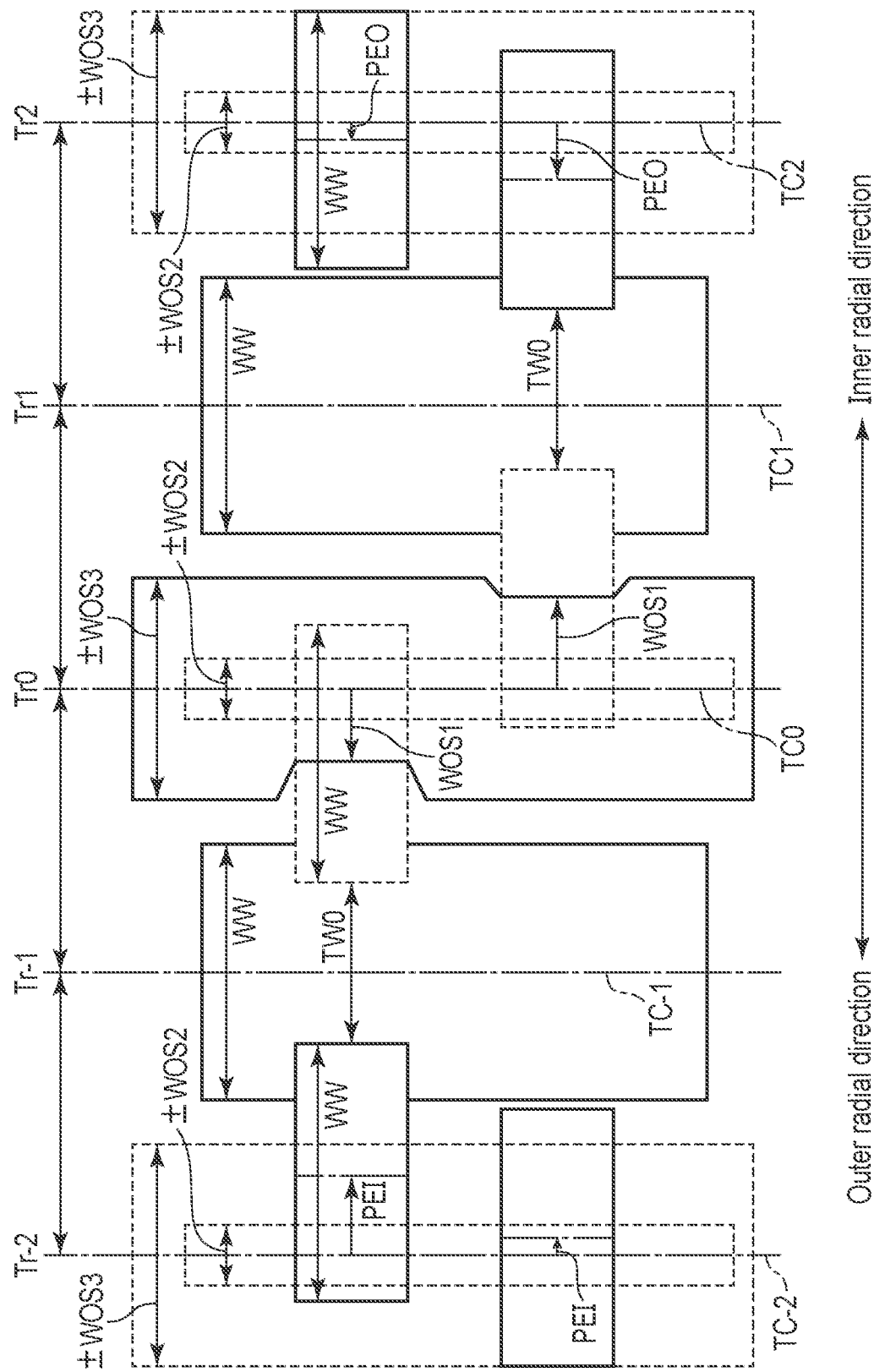
F I G. 7

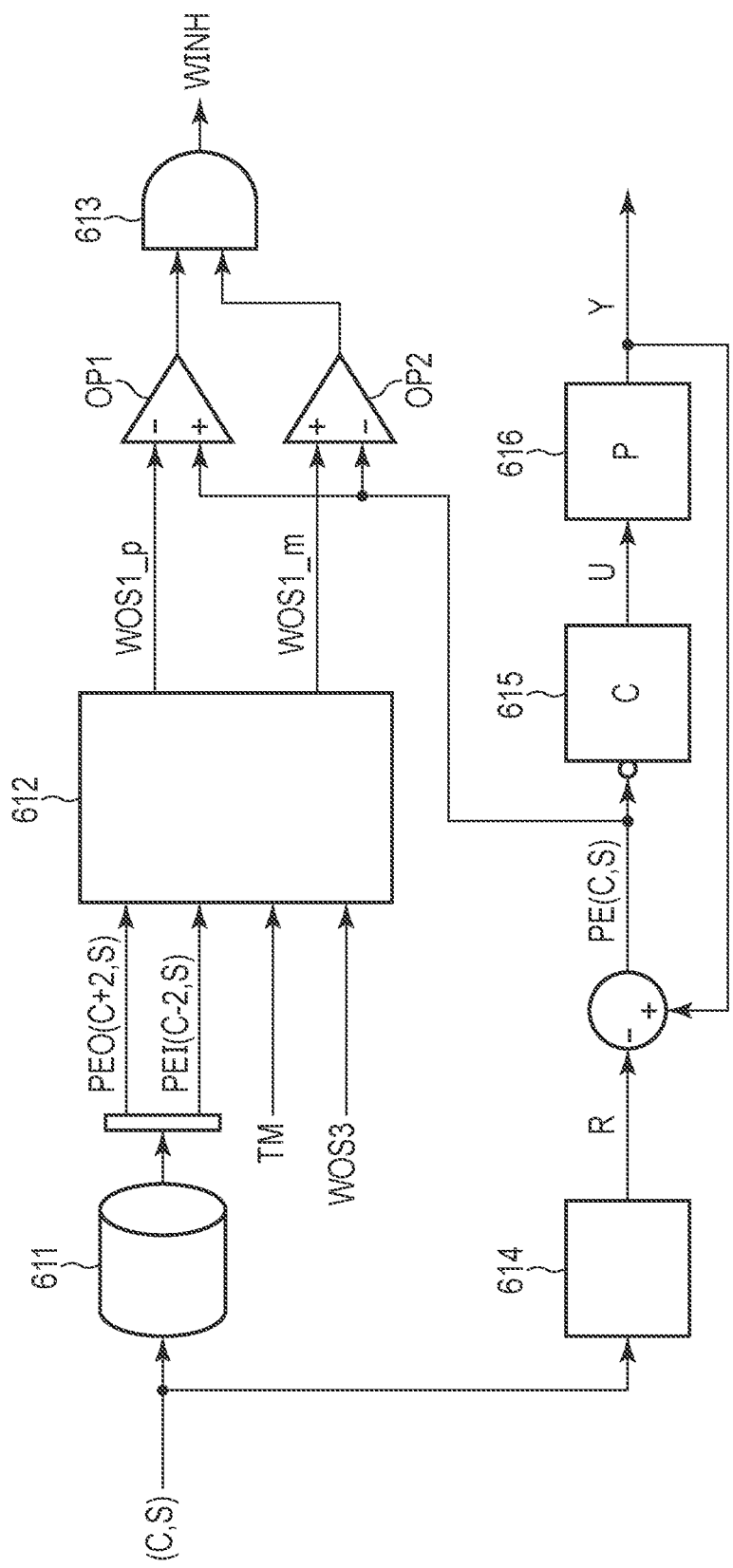
F I G. 8

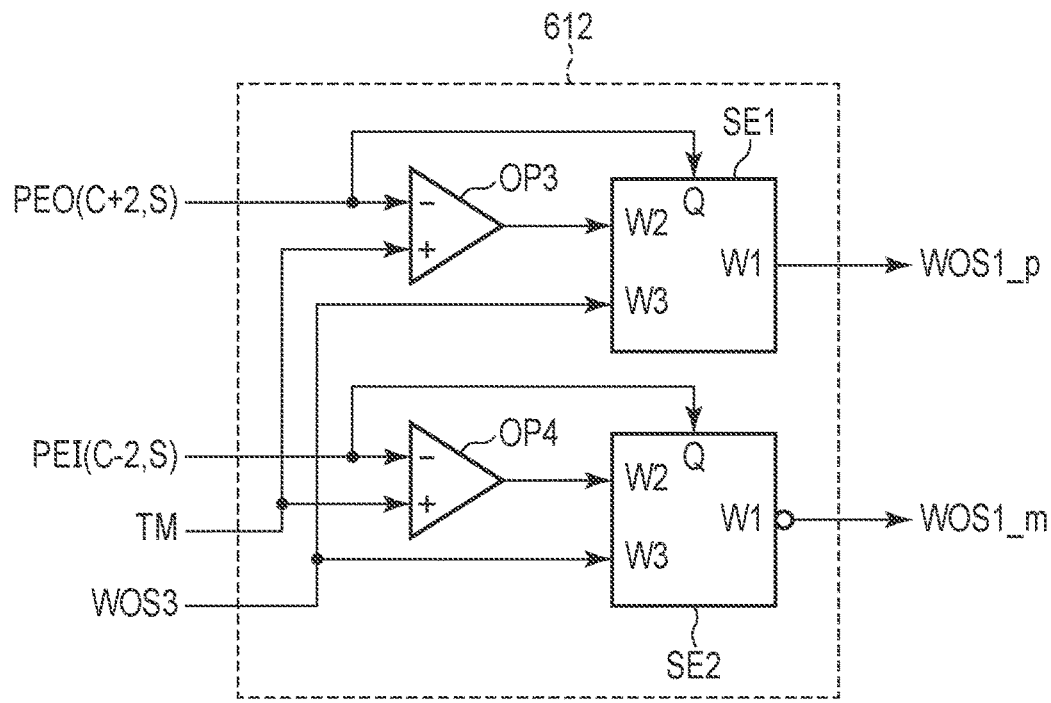
F I G. 9
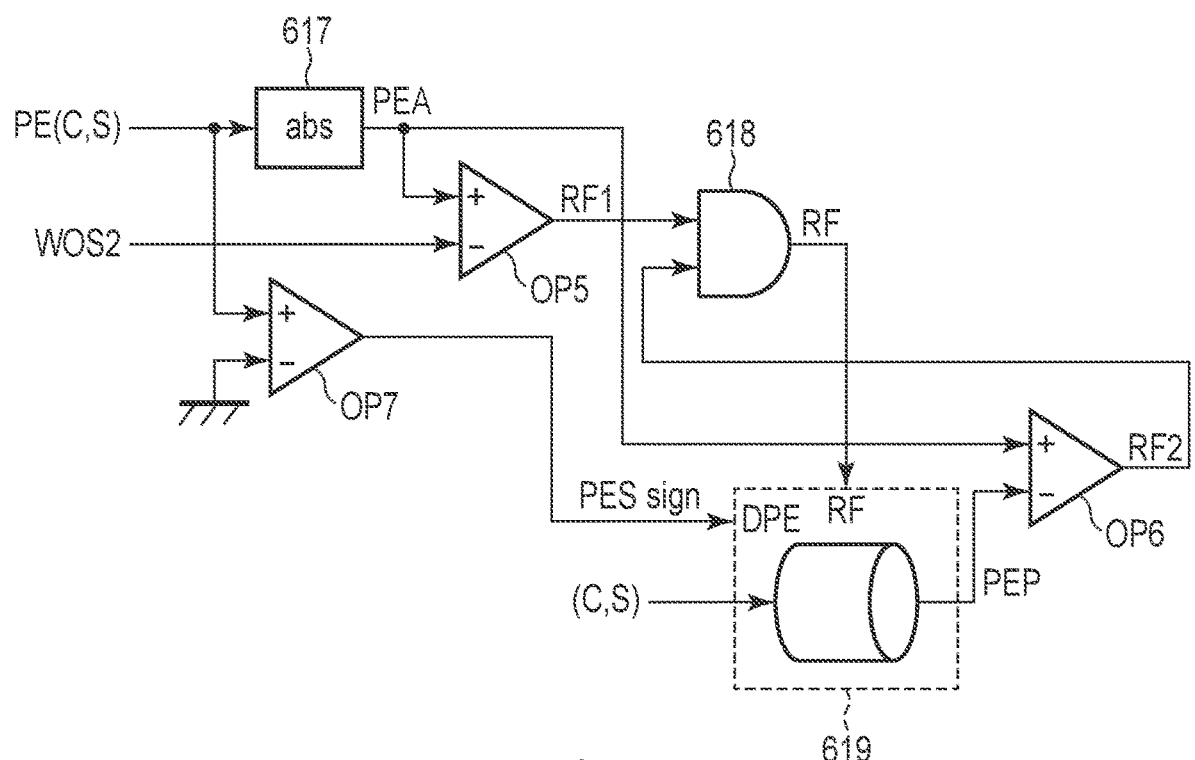
F I G. 10

| Entry# | C | H | S | PEI | PEO | Remarks |
|---|---|---|---|---|---|---|
| 1 | 58312 | 3 | 133 | 0 | 3.2 | |
| 2 | 2116 | 12 | 26 | 4.2 | 2.9 | |
| ⋮ | | | | | | |
| 2400 | 14420 | 8 | 420 | 4.0 | 0 | |
| 2401 | 86355 | 17 | 213 | 3.8 | 0 | |
| 2402 | | | | 0 | 0 | Empty |
| ⋮ | | | | ⋮ | ⋮ | ⋮ |
| 10000 | | | | 0 | 0 | Empty |

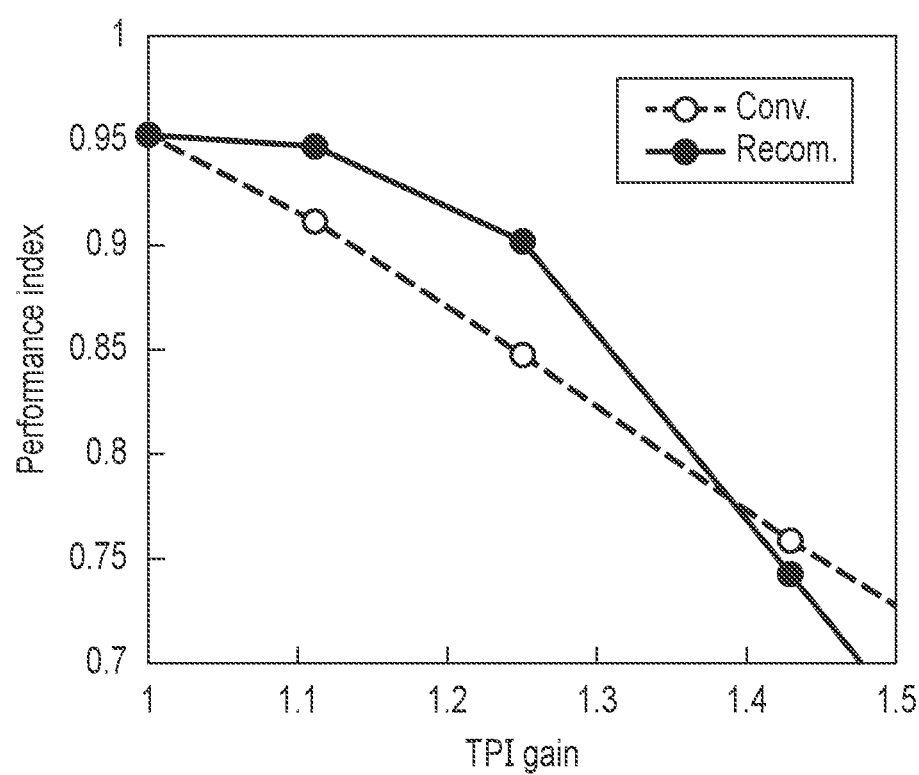
F I G. 18

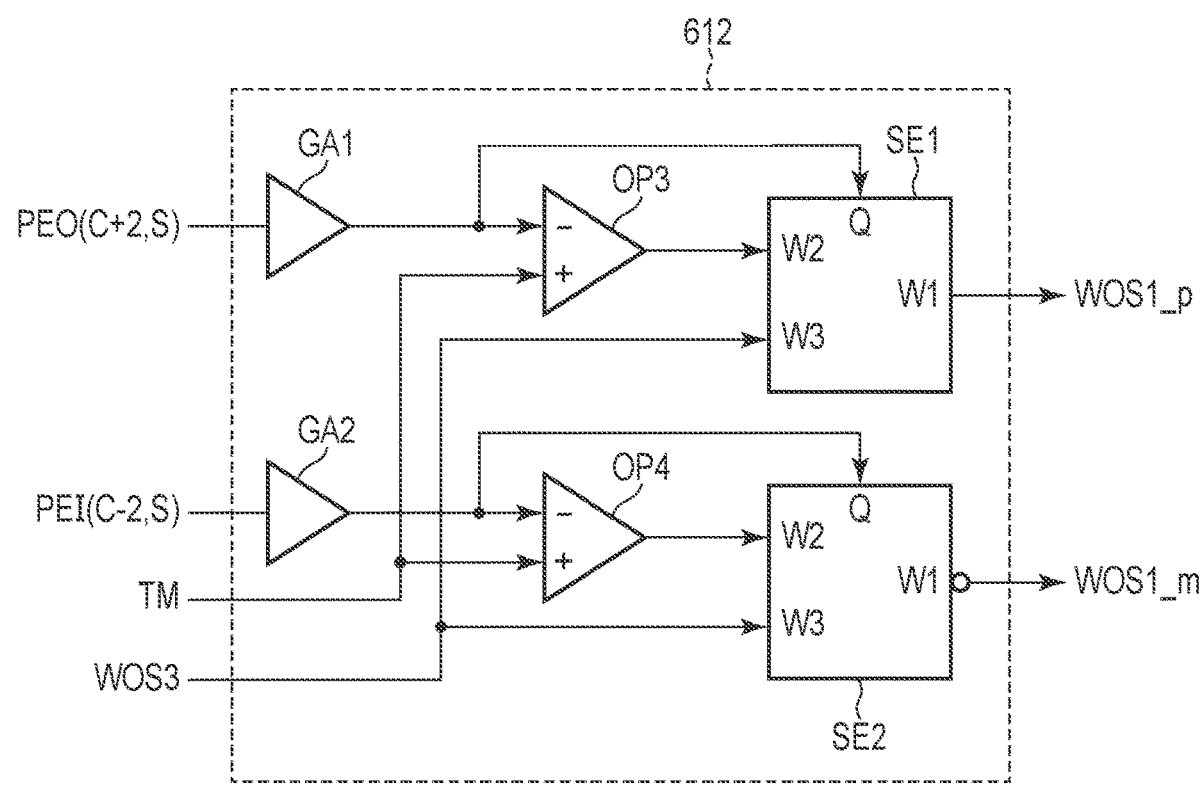
F I G. 21

MAGNETIC DISK DEVICE

CROSS-REFERENCE TO RELATED APPLICATIONS

This application is based upon and claims the benefit of priority from Japanese Patent Applications No. 2022-030916, filed Mar. 1, 2022; and No. 2022-116443, filed Jul. 21, 2022, the entire contents of all of which are incorporated herein by reference.

FIELD

Embodiments described herein relate genera to a magnetic disk device.

BACKGROUND

A magnetic disk device includes a magnetic disk (Hereinafter, also referred to as a disk), a magnetic read head (Hereinafter, also referred to as a head.) that writes data to the disk, a system controller (Hereinafter, also referred to as a controller), and the like.

The controller controls positioning control (Hereinafter, also simply referred to as "positioning") of the head with respect to a plurality of tracks formed on the disk in a substantially concentric shape. The head may be positioned off-track relative to the track in a radial direction of the disk. When an off-track amount is large, a risk of erasing data recorded in the adjacent track increases. Therefore, the controller provides a constant static threshold for the off-track amount, and stops a write operation when the off-track amount exceeds the threshold. In order to quantify the risk of data erasure, a track width narrowing amount at which a read error rate is allowed is defined, and this is referred to as a TPI margin.

BRIEF DESCRIPTION OF THE DRAWINGS

FIG. 2 is a diagram illustrating an example of basic write processing of the magnetic disk device.

FIG. 3 is a diagram illustrating an example of write processing of the magnetic disk device according to the embodiment.

FIG. 7 is a diagram illustrating an example of write processing of the magnetic disk device according to the embodiment.

FIG. 8 is a block diagram illustrating an example of a control configuration of the magnetic disk device according to the embodiment.

FIG. 9 is a block diagram illustrating a tightening processing circuit according to the embodiment.

FIG. 10 is a block diagram illustrating an example of a control configuration of the magnetic disk device according to the embodiment.

FIG. 18 is a graph illustrating an effect of the magnetic disk device according to the embodiment.

FIG. 21 is a block diagram illustrating a tightening processing circuit in a modification example of the magnetic disk device according to another embodiment.

DETAILED DESCRIPTION

Embodiments will be described hereinafter with reference to the accompanying drawings.

In general, according to one embodiment, a magnetic disk device comprising: a magnetic disk; a magnetic head that is positioned on a track having a predetermined track pitch of the magnetic disk, writes data to the track of the magnetic disk, and reads data from the track of the magnetic disk; and a controller that controls positioning of the magnetic head, and registers an address of a sector of the track in which the data is written and a positioning error of the magnetic head with respect to the track at the address, determines whether or not a positioning error of a second sector that is two tracks ahead in a radial direction of a first sector to which the data is written is registered, and when the positioning error of the second sector is registered, sets a first threshold that allows a write operation for a positioning error of the first sector based on the positioning error of the second sector, and determines whether or not the positioning error of the first sector exceeds the first threshold, and stops the write operation when the positioning error of the first sector exceeds the first threshold.

Hereinafter, embodiments will be described with reference to the drawings. Note that the drawings are merely examples, and do not limit the scope of the invention.

Figure 1:
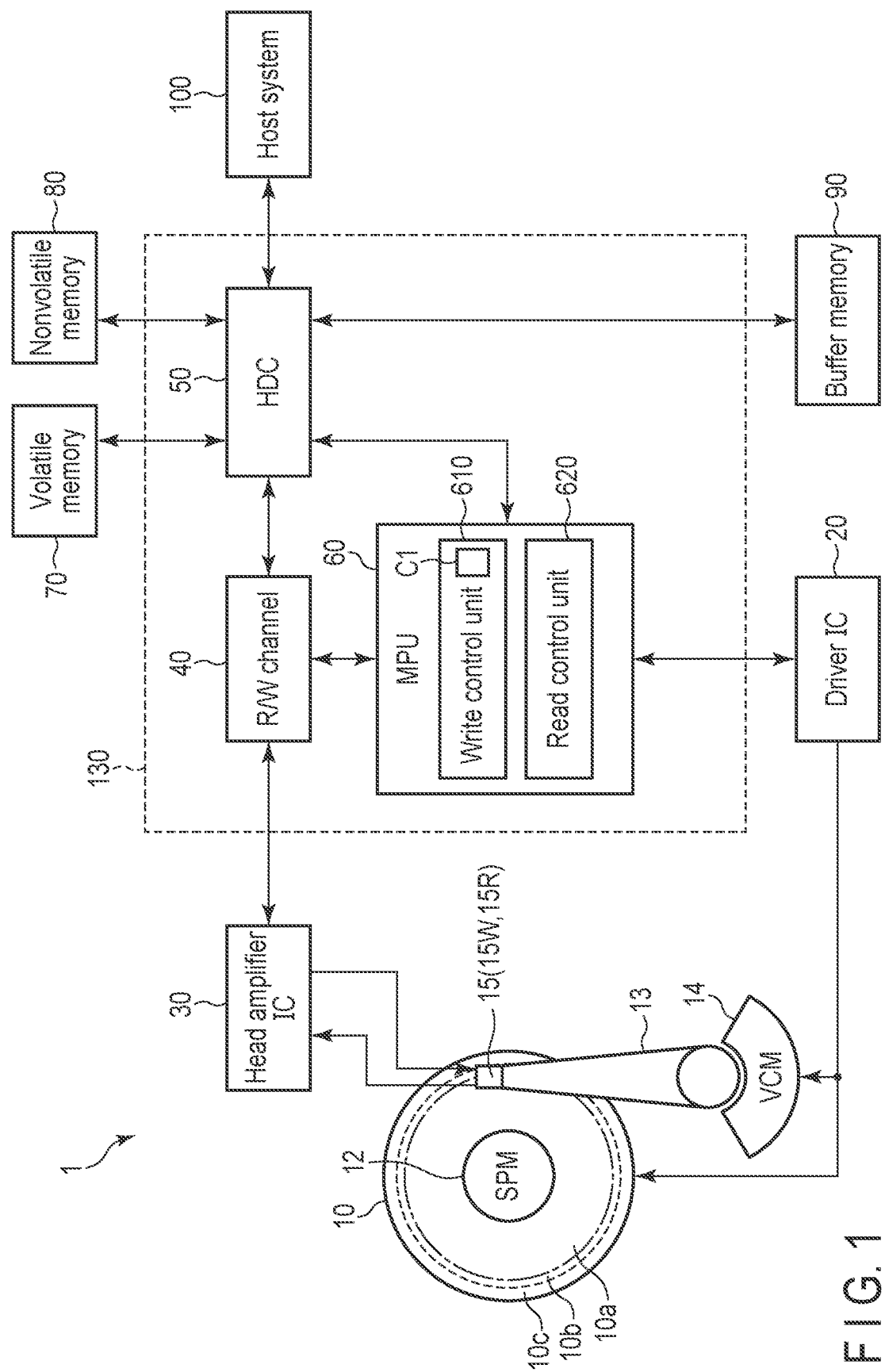
FIG. 1 is a block diagram illustrating a configuration of a magnetic disk device according to an embodiment.

FIG. 1 is a block diagram illustrating a configuration of a magnetic disk device 1 according to an embodiment.

The magnetic disk device 1 includes a head disk assembly (HDA) described later, a driver IC 20, a head amplifier integrated circuit (Hereinafter, it may be referred to as a head amplifier IC or a preamplifier.) 30, a volatile memory 70, a nonvolatile memory 80, a buffer memory (buffer) 90, and a system controller 130 that is a one-chip integrated circuit. Further, the magnetic disk device 1 is connected to a host system (host) 100.

The HDA includes a magnetic disk (Hereinafter, referred to as a disk.) 10, a spindle motor (SPM) 12, an arm 13 on which a magnetic head 15 is mounted, and a voice coil motor (VCM) 14. The disk 10 is attached to the spindle motor 12 and rotates by driving of the spindle motor 12. The arm 13 and the voice coil motor 14 constitute an actuator. The actuator controls the movement of the magnetic head 15 mounted on the arm 13 to a predetermined position of the disk 10 by driving of the voice coil motor 14. Two or more disks 10 and magnetic heads 15 may be provided.

Hereinafter, data to be written to each unit of the magnetic disk device 1 and an external device, for example, the disk 10 may be referred to as write data, and data read from each unit of the magnetic disk device 1 and an external device, for example, the disk 10 may be referred to as read data. The write data may be simply referred to as data, the read data may be simply referred to as data, or the write data and the read data may be collectively referred to as data.

In the disk 10, a user data region 10a available from a user, a media cache region 10b that temporarily holds data (or a command) transferred from the host 100 or the like before being written to a predetermined region of the user data region 10a, and a system region 10c that records information necessary for system management are allocated as regions to which data can be written. Hereinafter, a direction orthogonal to a radial direction of the disk 10 is referred to as a circumferential direction. Note that the media cache region 10b is not necessarily allocated, and the system region 10c may be allocated to the nonvolatile memory 80 or the like.

The magnetic head (Hereinafter, also referred to as a head.) 15 includes a slider as a main body, and includes a write head 15W and a read head 15R mounted on the slider. The write head 15W writes data to a track of the disk 10. The read head 15R reads data recorded in a track of the disk 10. Note that the write head 15W may be simply referred to as the head 15, the read head 15R may be simply referred to as the head 15, or the write head 15W and the read head 15R may be collectively referred to as the head 15. The "track" is used as one region among a plurality of regions obtained by dividing the disk 10 in the radial direction, one region among a plurality of regions obtained by dividing the disk 10 in the circumferential direction, data written at a predetermined position of the disk 10, data written in a sector, or various other meanings. Further, a width in the radial direction of the track is referred to as a track width, and a center position of the track width is referred to as a track center.

The driver IC 20 controls driving of the spindle motor 12 and the VCM 14 according to control of the system controller 130 (an MPU 60 to be specifically described later).

The head amplifier IC (preamplifier) 30 includes a read amplifier and a write driver. The read amplifier amplifies a read signal read from the disk 10 by the read head 15R, and outputs the amplified read signal to the system controller 130 (a read/write (R/W) channel 40 to be specifically described later). The write driver outputs a write current corresponding to a signal output from the R/W channel 40 to the write head 15W.

The volatile memory 70 is a semiconductor memory in which stored data is lost when power supply is cut off. The volatile memory 70 stores data and the like necessary for processing in each unit of the magnetic disk device 1. The volatile memory 70 includes, for example, a dynamic random access memory (DRAM) or a synchronous dynamic random access memory (SDRAM).

The nonvolatile memory 80 is a semiconductor memory that records stored data even when power supply is cut off. The nonvolatile memory 80 is, for example, a NOR type or NAND type flash read only memory (FROM).

The buffer memory 90 is a semiconductor memory that temporarily records data and the like transmitted and received between the magnetic disk device 1 and the host 100. Note that the buffer memory 90 may be configured integrally with the volatile memory 70. The buffer memory 90 is, for example, a DRAM, a static random access memory (SRAM), an SDRAM, a ferroelectric random access memory (FeRAM), or a magnetoresistive random access memory (MRAM).

The system controller (controller) 130 is realized by using, for example, a large-scale integrated circuit (LSI) called a system-on-a-chip (SoC) in which a plurality of elements are integrated on a single chip. The system controller 130 includes the read/write (R/W) channel 40, a hard disk controller (HDC) 50, and the microprocessor (MPU) 60. The system controller 130 is electrically connected to the driver IC 20, the head amplifier IC 30, the volatile memory 70, the nonvolatile memory 80, the buffer memory 90, and the host system 100.

The R/W channel 40 executes signal processing of read data transferred from the disk 10 to the host 100 and write data transferred from the host system 100 according to an instruction from the MPU 60 to be described later. The R/W channel 40 has a circuit or a function of measuring signal quality of the read data. The R/W channel 40 is electrically connected to, for example, the head amplifier IC, the HDC 50, the MPU 60, and the like.

The HDC 50 controls data transfer between the host system 100 and the R/W channel 40 according to an instruction from the MPU 60 to be described later. The HDC 50 is electrically connected to, for example, the R/W channel 40, the MPU 60, the volatile memory 70, the nonvolatile memory 80, the buffer memory 90, and the like.

The MPU 60 is a main controller that controls each unit of the magnetic disk device 1. The MPU 60 controls the VCM 14 via the driver IC 20 to execute servo control for positioning the head 15. Further, the MPU 60 controls the SPM 12 via the driver IC 20 to rotate the disk 10. The MPU 60 controls a write operation of data to the disk 10 and selects a storage destination of write data. Further, the MPU 60 controls a read operation of data from the disk 10 and controls processing of read data. The MPU 60 is connected to each unit of the magnetic disk device 1. The MPU 60 is electrically connected to, for example, the driver IC 20, the R/W channel 40, the HDC 50, and the like.

The MPU 60 includes a write control unit 610 that controls write processing, a read control unit 620 that controls read processing, and the like. The MPU 60 executes processing of these units, for example, the write control unit 610, the read control unit 620, and the like on firmware. Note that the MPU 60 may include these units, for example, the write control unit 610 and the read control unit 620 as circuits.

The write control unit 610 controls write processing of data in accordance with a command from the host 100 or the like. The write control unit 610 controls the VCM 14 via the driver IC 20, disposes the head 15 at a predetermined position on the disk 10, and writes data. Hereinafter, "a central part of the head 15 (the write head 15W or the read head 15R) is positioned at a predetermined position" or "a central part of the head 15 (the write head 15W or the read head 15R) is disposed at a predetermined position" may be simply referred to as "the head 15 (the write head 15W or the read head 15R) is positioned at a predetermined position" or "the head 15 (the write head 15W or the read head 15R) is disposed at a predetermined position". Further, "the head 15 (the write head 15W or the read head 15R) is positioned at a predetermined position" or "the head 15 (the write head 15W or the read head 15R) is disposed at a predetermined position" may be simply referred to as "positioning" or "disposing".

The write control unit 610 writes data by disposing the head 15 (write head 15W) at a target position (Hereinafter, it may be referred to as a target position or a target write position.) during the write processing. The write control unit 610 performs random writing by disposing the head 15 at the target write position. In other words, the write control unit 610 randomly writes data by disposing the head 15 at a target radial position (Hereinafter, it may be referred to as a target radial position or a target write radial position.) at the time of the write processing at a predetermined position. For example, the write control unit 610 randomly writes a predetermined sector by controlling the head 15 to be disposed at the target write radial position at the predetermined position.

The write control unit 610 can randomly write data to a predetermined position (Hereinafter, it may be referred to as an actual position or an actual write position.) by controlling the head 15 to be disposed at the target write position. The actual write position may be the target write position or a position displaced from the target write position.

Hereinafter, "a central part of the write head 15W is displaced in the radial direction from a predetermined target write position" may be described as "the write head 15W off-tracks from a predetermined track".

Further, the write control unit 610 includes a write processing circuit Cl described later in the description of FIG. 8. Note that the write processing circuit Cl may be provided outside the write control unit 610.

The read control unit 620 controls read processing of data in accordance with a command from the host 100 or the like. The read control unit 620 controls the VCM 14 via the driver IC 20, disposes the head 15 at a predetermined position on the disk 10, and reads data. The read control unit 620 may read data randomly or sequentially.

The read control unit 620 disposes the head 15 (read head 15R) at a target read position and reads data. The read control unit 620 performs reading by disposing the head 15 at the target read position. In other words, the read control unit 620 reads data by controlling the head 15 to be disposed at a target read radial position at a predetermined position. For example, the read control unit 620 reads a predetermined sector by controlling the head 15 to be disposed at the target read radial position at the predetermined position. Note that the read control unit 620 may read a predetermined track by controlling the head 15 along a target read path.

Here, a basic concept of the embodiment will be described.

The position of the head (magnetic recording/read head) 15 of the magnetic disk device 1 in the radial direction is controlled by an actuator including the VCM 14 and the like so as to remain on a track formed in the circumferential direction of the magnetic disk 10. The above control is also referred to as positioning control. When vibration, impact, or the like is externally applied to the actuator including the head and the magnetic disk device 1 on which the magnetic disk 10 is mounted, the head 15 may write to an actual position deviated from a target position. In order to prevent the occurrence of the deviation, in the magnetic disk device 1, positioning of the head 15 is controlled by a feedback loop. Hereinafter, the deviation between the target position and the actual position is also referred to as a positioning error.

When the positioning error caused by the positioning control is large, there is an increased risk of erasing data recorded in an adjacent track. Therefore, a threshold (write off-track slice (WOS)) is provided for the positioning error, and when the threshold is exceeded, the write operation is stopped to prevent erasing of data recorded in the adjacent track. The threshold is hereinafter also referred to as a write off-track threshold.

Hereinafter, the write processing will be described with reference to the drawings.

FIG. 2 is a diagram illustrating an example of basic write processing of the magnetic disk device 1. In FIG. 2, an upper part illustrates an example when data is written in the order of a track Tr1, a track Tr0, and a track Tr2 in three consecutive tracks arranged in the order of the track Tr0, the track Tr1, and the track Tr2 from an outer radial direction along the radial direction. A lower part illustrates an example of a case where a track width TW of a data region D1 of the data described in the track Tr1 becomes a track width TW0 which is a lower limit for reading. In FIGS. 2 to 7, a data region of data in which the track width TW to be protected becomes the track width TW0 is indicated by a broken line.

As illustrated in the upper part of FIG. 2, each data region of data written to the track Tr0, the track Tr1, and the track Tr2 has a write width WW. The data described in the track Tr0 is written with a shift (Hereinafter, shifting is also referred to as "offset".) toward the track Tr1. Specifically, the data region D0 of the data written to the track Tr0 is located offset from a track center TC0 of the track Tr0 by an error (Hereinafter, also referred to as a positioning error, an offset amount, or an off-track amount.) PEI toward an inner radial direction.

The data described in the track Tr2 is written offset toward the track Tr1. Specifically, the data region D2 of the data described in the track Tr2 is located offset from a track center TC2 of the track Tr2 by an error (Hereinafter, also referred to as a positioning error, an offset amount, or an off-track amount.) PEO toward the outer radial direction.

When data is written to each track as described above, the data region D1 in the data described in the track Tr1 has the track width TW. When the track width TW is expressed using the write width WW, a track pitch TP, the error PEI, and the error PEO, the track width TW can be expressed by Formula (1) described below. Note that TW represents a track width, WW represents a write width, TP represents a track pitch, and PEI and PEO represent errors.

$$TW=2TP-WW-(PEO+PEI) \tag{1}$$

When the track width of the data region becomes less than the track width which is a lower limit for reading, data cannot be read. Specifically, when the track width TW becomes less than the track width TW0 described in the lower part, the data described in the data region D1 cannot be read. In order to prevent these, when data is written, a limit is set on a total amount that can be offset from each track (the track Tr0 and the track Tr2) adjacent to the track Tr1. From Formula (1), a sum of the error PEO and the error PEI can be expressed by the following formula.

$$PEO+PEI=2TP-WW-TW$$

Here, considering a state in which the track pitch TP is narrowed and the track width of the track Tr1 is reduced and reaches the read limit, a value obtained by subtracting the write width and the track width TW0 from twice the track pitch TP can be defined as a track per inch (TPI) margin (also referred to as a track pitch narrowing (Track Squeeze) margin) TM, and a condition that the sum of the error PEO and the error PEI should satisfy can be expressed by Formula (2) described below. Note that TW0 represents the track width which is a lower limit for reading, and TM represents a TPI margin.

$$PEO+PEI \leq 2TP-WW-TW0=TM \qquad (2)$$

As a sufficient condition for the sum of the error PEI and the error PEO to satisfy Formula (2), individual off-track amounts PEI and PEO have been conventionally limited. Specifically, the off-track amount PEO is half or less of the TPI margin TM, and the off-track amount PEI is half or less of the TPI margin TM. That is, half of the TPI margin TM is used as a threshold of the off-track amount PEI and the off-track amount PEO.

By the way, when the track pitch TP is reduced to increase the capacity of the magnetic disk device 1, the TPI margin TM is also reduced in conjunction therewith as shown in Formula (1), so that the off-track amounts PEO and PEI easily exceed the threshold, write errors frequently occur, and a problem that write performance for overheads due to a retry operation is deteriorated occurs.

In order to cope with this problem, a magnetic disk device 1 of SMR (shingled magnetic recording system) discloses a technology of recording a positioning error at the time of sequential write and dynamically setting a write-off track threshold with reference to the positioning error at the time of adjacent track write to prevent a decrease in write performance. However, this prior art is based on the premise that the SMR performs a sequential write operation, and uses the fact that a positioning error before one track can be stored with a small memory capacity, so that this technology cannot be applied as it is to a random write operation.

Therefore, the embodiment of the present invention solves such a problem, and it is possible to obtain a magnetic disk capable of suppressing deterioration in write performance by dynamically setting the write-off track threshold even for random write. Furthermore, it is also possible to obtain a magnetic disk having a high track density while ensuring read quality.

Hereinafter, the write processing according to the present embodiment will be described with reference to the drawings.

FIG. 3 is a diagram illustrating an example of write processing of the magnetic disk device 1 according to the embodiment. FIG. 3 illustrates a case where data is written in order of a track Tr1, a track Tr2, and a track Tr0. As illustrated in FIG. 3, the data region D2 is offset by the off-track amount PEO. When the off-track amount PEO of the data region D2 is known, a first threshold (also referred to as a first off-track threshold) WOS1 when data is written to the track Tr0 thereafter is determined. That is, when the off-track amount PEO of the data region D2 is known, the first threshold WOS1 may be determined when writing to the track Tr0 is performed. The first threshold WOS1 is a threshold for determining whether or not the write operation is permitted when data is written to the track Tr0.

The first threshold WOS1 is a value obtained by subtracting the offset amount PEO of the data region D2 from the TPI margin TM, and can be expressed by Formula (3) described below. Note that WOS1 is the first threshold.

$$WOS1=TM-PEO \qquad (3)$$

Since the off-track amount PEI that can offset the data region D0 is limited by the first threshold WOS1, the relationship between the off-track amount PEI and the first threshold WOS1 is expressed by the following formula.

$$PEI \leq WOS1=TM-PEO$$

When the above formula is expressed using the off-track amounts PEO and PEI and the TPI margin TM, the following formula is obtained.

$$PEI+PEO \leq TM$$

From the above formula, the TPI margin TM is a value larger than or equal to the sum of the off-track amount PEI of the track Tr2 and the off-track amount PEO of the track Tr0.

The following formula is established from the above formulas (PEI+PEO≤TM), (1), and (2).

$$TW \geq 2TP-WW-TM=TW0$$

That is, by setting the first threshold WOS1 to a value obtained by subtracting the off-track amount PEO of the data region from the TPI margin TM as in Formula (3), the track width TW for reading the data written to the track Tr1 can be secured. In other words, the read quality of the data written to the track Tr1 can be guaranteed.

Figure 4:
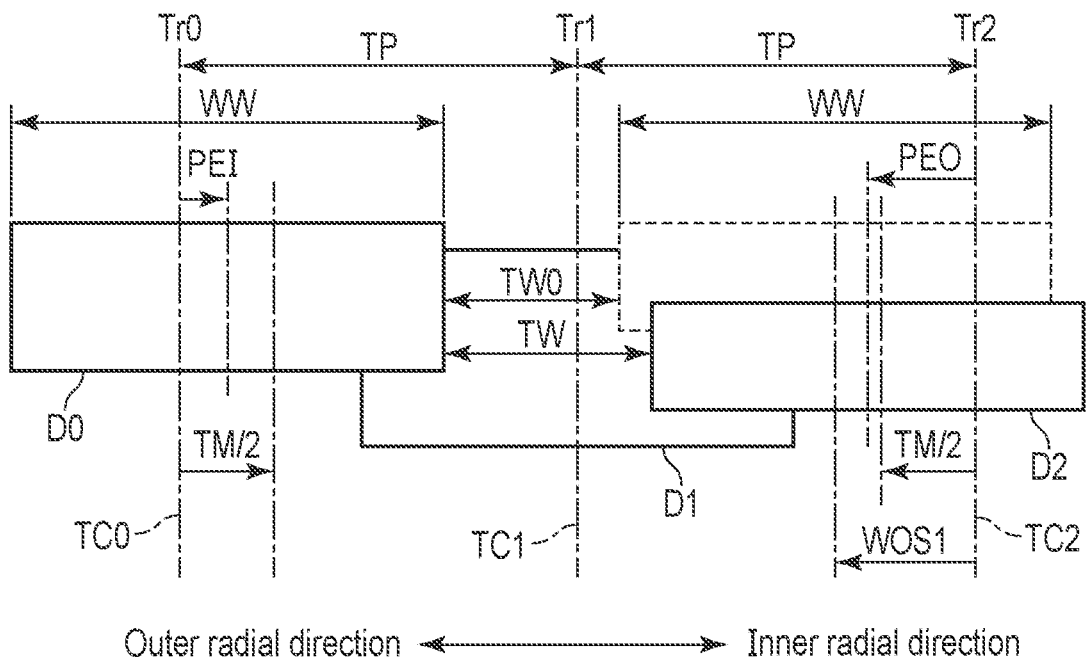
FIG. 4 is a diagram illustrating an example of write processing of the magnetic disk device according to the embodiment.

The first threshold WOS1 can be determined even when data is written in the order of the track Tr1, the track Tr0, and the track Tr2. With reference to FIG. 4, determination of the first threshold WOS1 in a case where data is written as described above will be described.

FIG. 4 is a diagram illustrating an example of write processing of the magnetic disk device 1 according to the embodiment. FIG. 4 illustrates a case where data is written in order of the track Tr1, the track Tr0, and the track Tr2. As illustrated in FIG. 4, the data region D0 is offset by the off-track amount PEI. When the off-track amount PEI of the data region D0 is known, similarly to the description of FIG. 3, the first threshold WOS1 when data is subsequently written to the track Tr2 is determined. That is, when the off-track amount PEI of the data region D0 is known, the first threshold WOS1 for writing to the track Tr2 may be determined. The first threshold WOS1 is a threshold for determining whether or not the write operation is permitted when data is written to the track Tr2.

The first threshold WOS1 is a value obtained by subtracting the offset amount PEI of the data region D0 from the TPI margin TM, and can be expressed by Formula (4) described below.

$$WOS1=TM-PEI \qquad (4)$$

By setting the first threshold WOS1 to a value obtained by subtracting the off-track amount PEI of the data region D0 from the TPI margin TM as in Formula (4), it is possible to secure the track width TW for reading the data written in the track Tr1, similarly to the description of FIG. 3.

Hereinafter, a case where data is written in order of the track Tr1, the track Tr2, and the track Tr0 will be described with reference to FIGS. 5 and 6, but a case where data is written in order of the track Tr1, the track Tr0, and the track Tr2 can be similarly considered.

In the description of FIG. 3, the off-track amount PEI of the track Tr0 is limited by the first threshold WOS1 determined from the offset amount PEO of the data region D2 of the data written in the track Tr2 (See Formula (3)). However, in order to prevent the offset amount PEI from being significantly limited by the first threshold WOS1 when the offset amount PEO is an extremely large value and the write performance on the track Tr0 from deteriorating, the off-track amount PEI may be further limited by the third threshold WOS3 independent of a position error at the time of writing. The third threshold WOS3 is a static threshold. Write processing in a case where the third threshold WOS3 is set will be described with reference to FIG. 5.

Figure 5:
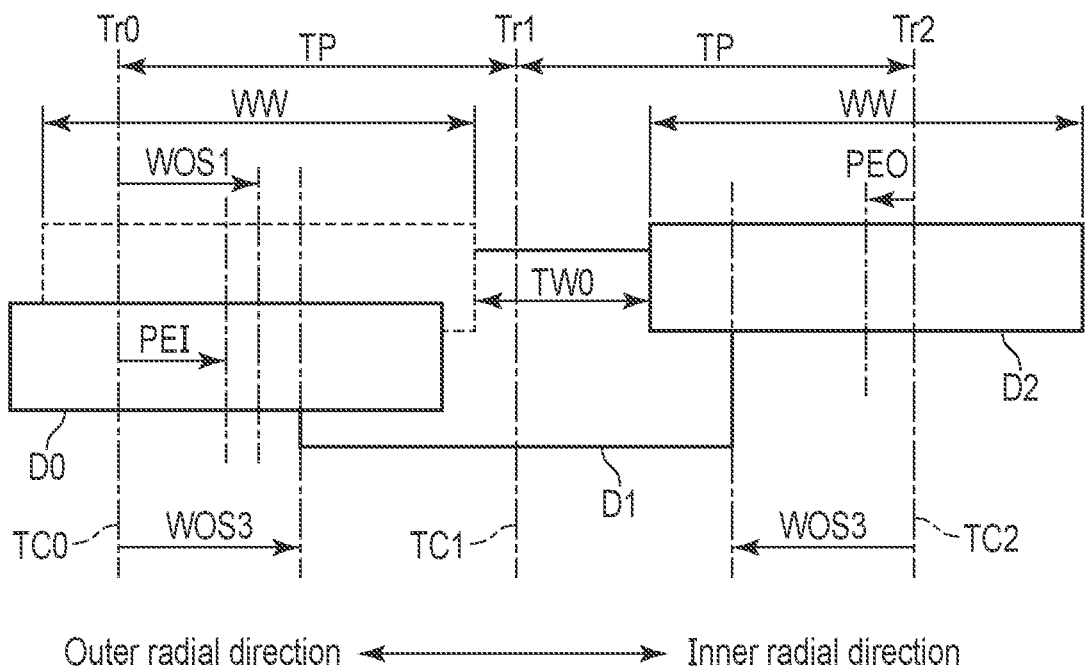
FIG. 5 is a diagram illustrating an example of write processing of the magnetic disk device according to the embodiment.

FIG. 5 is a diagram illustrating an example of write processing of the magnetic disk device 1 according to the embodiment. As illustrated in FIG. 5, the off-track amount PEI of the data region D0 of the data written to the track Tr0 is limited by a predetermined third threshold WOS3 irrelevant to the off-track amount PEO of the data region D2 of the data previously written to the track Tr2. On the other hand, the off-track amount PEO of the data region D2 is also limited by the predetermined third threshold WOS3.

A settable range of the third threshold WOS3 will be described below.

Since the off-track amount PEO is limited by the third threshold WOS3, the relationship between the off-track amount PEO and the third threshold WOS3 can be expressed by the following formula. Note that WOS3 described in the formula represents the third threshold.

$$PEO \leq WOS3$$

In consideration of Formula (3) and the above formula, the relationship between the first threshold WOS1 and the third threshold WOS3 is expressed by the following formula.

$$WOS1 = TM - PEO \geq TM - WOS3$$

Furthermore, considering that the first threshold WOS1 is 0 or more and the above formula (TM−WOS3 is a lower limit value of WOS1), the third threshold WOS3 can be expressed by the following formula.

$$WOS3 \leq TM$$

From the above formula, the TPI margin TM can be set as an upper limit of the third threshold WOS3.

On the other hand, the third threshold WOS3 is larger than or equal to the first threshold WOS1. Further, the third threshold WOS3 is larger than or equal to the off-track amount PEO. That is, the relationship among the third threshold WOS3, the first threshold WOS1, and the off-track amount PEO can be expressed by the following formula.

$$WOS1 + PEO \leq 2WOS3$$

In consideration of Formula (3) and the above formula, the third threshold WOS3 can be expressed by the following formula.

$$TM/2 \leq WOS3$$

From the above formula, a half value of the TPI margin TM can be set as the lower limit of the third threshold WOS3.

That is, a settable range of the third threshold WOS3 is from a half value of the TPI margin TM to the TPI margin TM. A settable range of the third threshold WOS3 is expressed by a formula as follows.

$$TM/2 \leq WOS3 \leq TM$$

FIG. 5 illustrates the processing assuming the case where the off-track amount PEO in the data region D2 becomes extremely large. However, in a case where the off-track amount PEO is a small value to some extent, it is conceivable that the first threshold WOS1 for limiting the off-track amount PEI of the data region D0 exceeds the static third threshold WOS3 (See Formula (3)). In the above case, data may be written to the track Tr0 without performing the limitation by the first threshold WOS1. The write processing performed using the second threshold WOS2 for determining whether or not to perform control using the first threshold WOS1 will be described with reference to FIG. 6.

Figure 6:
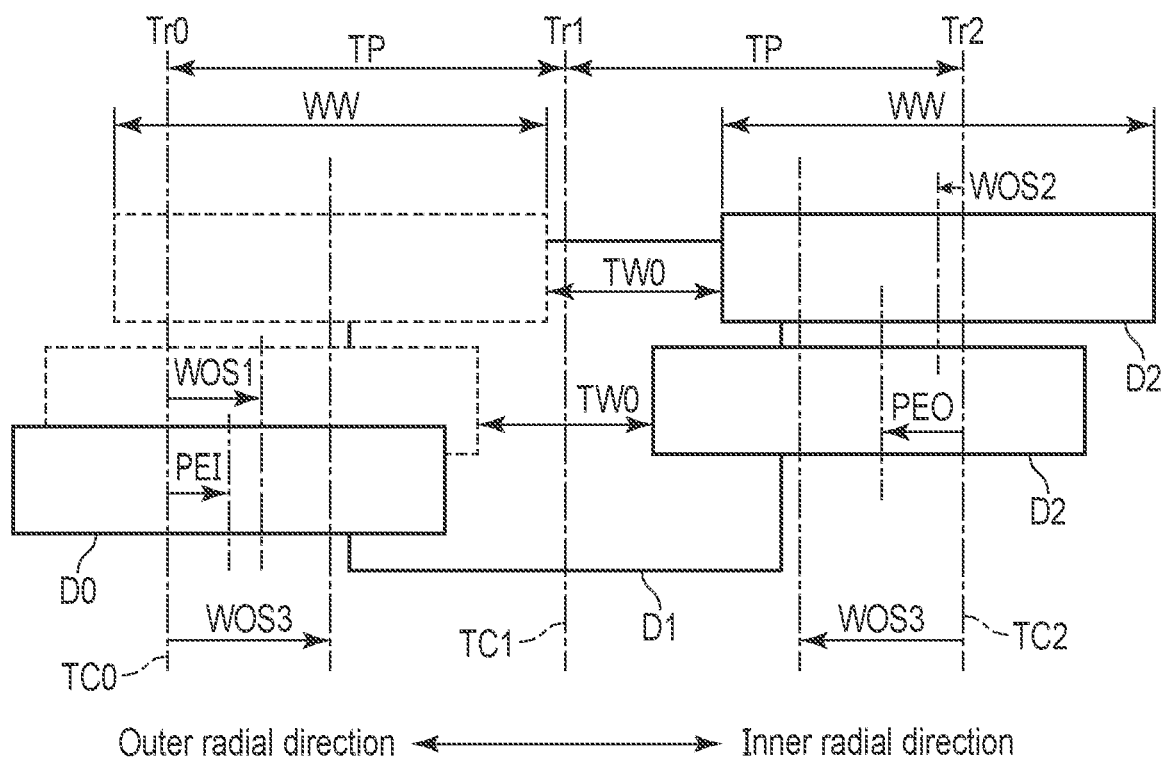
FIG. 6 is a diagram illustrating an example of write processing of the magnetic disk device according to the embodiment.

FIG. 6 is a diagram illustrating an example of write processing of the magnetic disk device according to the embodiment. As illustrated in FIG. 6, the off-track amount PEO in the data region D2 exceeds the second threshold WOS2. In the above case, the off-track amount PEI of the data region D0 of the data to be written to the track Tr0 is limited by the first threshold WOS1.

Hereinafter, the second threshold WOS2 will be described in detail.

The margin of the TPI margin TM with respect to the third threshold WOS3, which is a static threshold, is defined as a second threshold WOS2. At this time, the second threshold WOS2 can be expressed by Formula (5) below. Note that WOS2 is the second threshold.

$$WOS2 = TM - WOS3 \qquad (5)$$

Considering Formulas (3) and (5), the first threshold WOS1 is expressed by the following formula.

$$WOS1 = WOS3 - (PEO - WOS2)$$

Here, a condition for preventing the first threshold WOS1 from exceeding the third threshold WOS3 is expressed below from Formula (3).

$$WOS1 = TM - PEO \leq WOS3$$

Considering the above formula and Formula (5), the relationship between the second threshold WOS2 and the off-track amount PEO is expressed by the following formula.

$$PEO \geq TM - WOS3 = WOS2$$

The off-track amount PEI may be limited by the first threshold WOS1 only when the relationship between the second threshold WOS2 and the off-track amount PEO satisfies the above formula. In addition, as will be described later, since it is advantageous in terms of saving a storage area, the value of PEO may be stored only when the above formula is satisfied. That is, the second threshold WOS2 may be used as a threshold for determining whether or not the positioning error (off-track amount) PEO is registered.

Although an example of the write processing according to the embodiment corresponding to the error PEO in the outer radial direction has been illustrated using FIGS. 5 and 6, a case where the write processing is applicable to the error PEI in the inner radial direction and corresponds to both the error PEO and the error PEI is illustrated in FIG. 7.

FIG. 7 is a diagram illustrating an example of write processing of the magnetic disk device 1 according to the embodiment. As illustrated in FIG. 7, five tracks are aligned in the order of a track Tr-2, a track Tr-1, the track Tr0, the track Tr1, and the track Tr2 from the outer radial direction along the radial direction. FIG. 7 illustrates a situation in which data is written to the track Tr-2 and the track Tr2 and before the data is written to the track Tr0. Data is off-tracked and written to the track Tr0 such that the remaining width (track width) of the data written to the track Tr-1 and the track Tr1 becomes larger than or equal to the track width TW0. In other words, when the track Tr0 is written, the target of the data protection by the off-track write is the track Tr-1 and the track Tr1, and the positioning at the time of writing to the track Tr0 is restricted such that the remaining width (track width) of the data on these tracks becomes the track width TW0 or more by the write operation to the track Tr0.

When the positioning error PEO in the outer radial direction is less than or equal to the second threshold WOS2 when the track Tr2 is written (See an upper part of FIG. 7), the information of the positioning error PEO in the outer radial direction is not registered. Therefore, the offset amount in the inner radial direction at the time of writing to the track Tr0 is limited by the static third threshold WOS3.

When the positioning error PEO in the outer radial direction exceeds the second threshold WOS2 when the track Tr2 is written (See a lower part of FIG. 7), the information of the positioning error PEO in the outer radial direction is registered. Therefore, the offset amount in the inner radial direction at the time of writing to the track Tr0 is limited by the dynamic first threshold WOS1. Note that the first threshold WOS1 is a value obtained by subtracting the registered positioning error PEO from the TPI margin TM.

When the positioning error PEI in the inner radial direction is equal to or less than the second threshold WOS2 when the track Tr-2 is written (See the lower part of FIG. 7), the information of the positioning error PEI in the inner radial direction is not registered. Therefore, the offset amount in the outer radial direction at the time of writing to the track Tr0 is limited by the static third threshold WOS3.

When the positioning error PEI in the inner radial direction exceeds the second threshold WOS2 when the track Tr-2 is written (See the upper part of FIG. 7), the information of the positioning error PEI in the outer radial direction is registered. Therefore, the offset amount in the inner radial direction at the time of writing to the track Tr0 is limited by the dynamic first threshold WOS1. Note that the first threshold WOS1 is a value obtained by subtracting the registered positioning error PEI from the TPI margin TM.

Hereinafter, a control configuration for realizing an off-track slice tightening process of setting a threshold (static third threshold WOS3 or dynamic first threshold WOS1 obtained by tightening the third threshold WOS3) and a write inhibition process of stopping a write operation when a positioning error at the time of writing exceeds the threshold will be described.

FIG. 8 is a block diagram illustrating an example of a control configuration of the magnetic disk device 1 according to the embodiment. In FIG. 8, as a target sector address (C, S), a head number H is omitted, and only a cylinder number C and a sector number S are shown. As illustrated in FIG. 8, the write processing circuit Cl of the write control unit 610 includes an off-track write table 611, a tightening processing circuit 612, operational amplifiers OP1 and OP2, an OR gate 613, a physical target transducer 614, a controller 615, and an actuator 616.

The target sector address (C, S) is converted into a physical target position R by the physical target transducer 614. A difference between a physical position Y where the magnetic head 15 is actually located and the physical target position R is a positioning error PE (C, S) at the sector address (C, S). Hereinafter, the "sector address" is also simply referred to as a "sector".

The positioning error PE (C, S) is negatively fed back to the controller 615 and output to an actuator P as a control amount U. The actuator P receives the control amount U and outputs the physical position Y of the magnetic head 15.

On the other hand, the positioning error PE (C, S) is input to the operational amplifiers OP1 and OP2, is compared with a write off-track threshold WOS1p (Hereinafter, it is also simply referred to as a "threshold".) on an inner radial side in the operational amplifier OP1, is compared with a write off-track threshold WOS1m (Hereinafter, it is also simply referred to as a "threshold".) on an outer radial side in the operational amplifier OP2, and when either the write off-track threshold WOS1p or the write off-track threshold WOS1m is exceeded, a write inhibit flag WINH is output from the OR gate 613. When the write inhibit flag WINH is output from the OR gate 613, the system controller 130 (more specifically, the write control unit 610) stops the write operation.

Further, the off-track write table 611 is referred from the target sector address (C, S), and a positioning error PEO (C+2, S) in the outer radial direction of the data region written in the sector (C+2, S) located in the inner radial direction for two tracks and a positioning error PEI (C−2, S) in the inner radial direction of the data region written in the sector (C−2, S) located in the outer radial direction for two tracks are output. The target sector address (C, S), the sector (C+2, S), and the sector (C−2, S) will be described with reference to FIG. 7 as an example. When the target sector address (C, S) is a sector located on the track Tr0, the sector (C−2, S) is a sector located on the track Tr-2, and the sector (C+2, S) is a sector located on the track Tr2.

The positioning error PEO (C+2, S), the positioning error PEI (C−2, S), the predetermined TPI margin TM, and the third threshold WOS3, which is a static value, are input to the tightening processing circuit 612, and write off-track thresholds WOS1p and WOS1m corresponding thereto are output.

FIG. 9 is a block diagram illustrating the tightening processing circuit 612 according to the embodiment. As illustrated in FIG. 9, the tightening processing circuit 612 includes operational amplifiers OP3 and OP4 and selectors SE1 and SE2. Whether or not the positioning error PEO (C+2, S) is zero is input to a terminal Q of the selector SE1. When the positioning error PEO is zero, the input to a terminal W3 is output from a terminal W1. When the positioning error PEO is other than zero, the input to a terminal W2 is output from the terminal W1. Whether or not the positioning error PEI (C−2, S) is zero is input to the terminal Q of the selector SE2. When the positioning error PEI is zero, the input to the terminal W3 is output from the terminal W1. When the positioning error PEI is other than zero, the input to the terminal W2 is output from the terminal W1.

The static third threshold WOS3 is input to a terminal W3. A value obtained by subtracting the positioning error PEI (C−2, S) from the TPI margin TM or a value obtained by subtracting the positioning error PEO (C+2, S) from the TPI margin TM is input to the terminal W2.

FIG. 10 is a block diagram illustrating an example of a control configuration of the magnetic disk device 1 according to the embodiment. FIG. 10 illustrates a configuration for registering and updating a positioning error in the off-track write table 611.

The positioning error PE (C, S) at the time of writing to the target sector address (C, S) is input to an absolute value circuit 617 and output as an absolute value PEA of the positioning error PE (C, S). The absolute value PEA is compared with the second threshold WOS2 for registration determination in an operational amplifier OP5. The operational amplifier OP5 outputs a registration flag RF1 as 1 when the absolute value PEA exceeds the second threshold WOS2, and outputs the registration flag RF1 as 0 when the absolute value PEA does not exceed the second threshold WOS2.

On the other hand, a reference update block (Hereinafter, it is also referred to as an OWT reference update block.) 619 of an off-track write table (OWT) outputs the past maximum positioning error PEP in the target direction of the target sector (sector (C, S) in one example). The target direction mentioned here means the same direction as the positioning error PE (C, S).

An operational amplifier OP6 compares the past maximum positioning error PEP with the absolute value PEA of the current positioning error PE (C, S), and outputs an update flag RF2 as 1 when the absolute value PEA exceeds the maximum positioning error PEP, and outputs the update flag RF2 as 0 when the absolute value PEA does not exceed the maximum positioning error PEP. Note that, when there is no entry of a sector (C, S) in the OWT reference update block 619 (described later in the description of FIG. 16), the maximum positioning error PEP is output as 0, and thus the operational amplifier OP6 outputs the update flag RF2 as 1.

The operational amplifier OP7 outputs the flag DPE as 1 when the positioning error PE (C, S) is smaller than 0, and outputs the flag DPE as 0 when the positioning error PE (C, S) is not smaller than 0. That is, the sign of the positioning error PE (C, S) can be specified by the flag DPE.

When the registration flag RF1 is output as 1 and the update flag RF2 is output as 1, an AND gate 618 outputs an update registration flag RF as 1. When the update registration flag RF is output as 1, information (specifically, PEI (C, S) or PEO (C, S)) corresponding to the sign of the positioning error PE (C, S) is updated or newly registered in the off-track write table 611.

Hereinafter, the procedure of the write processing of the present invention will be described.

Figure 11:
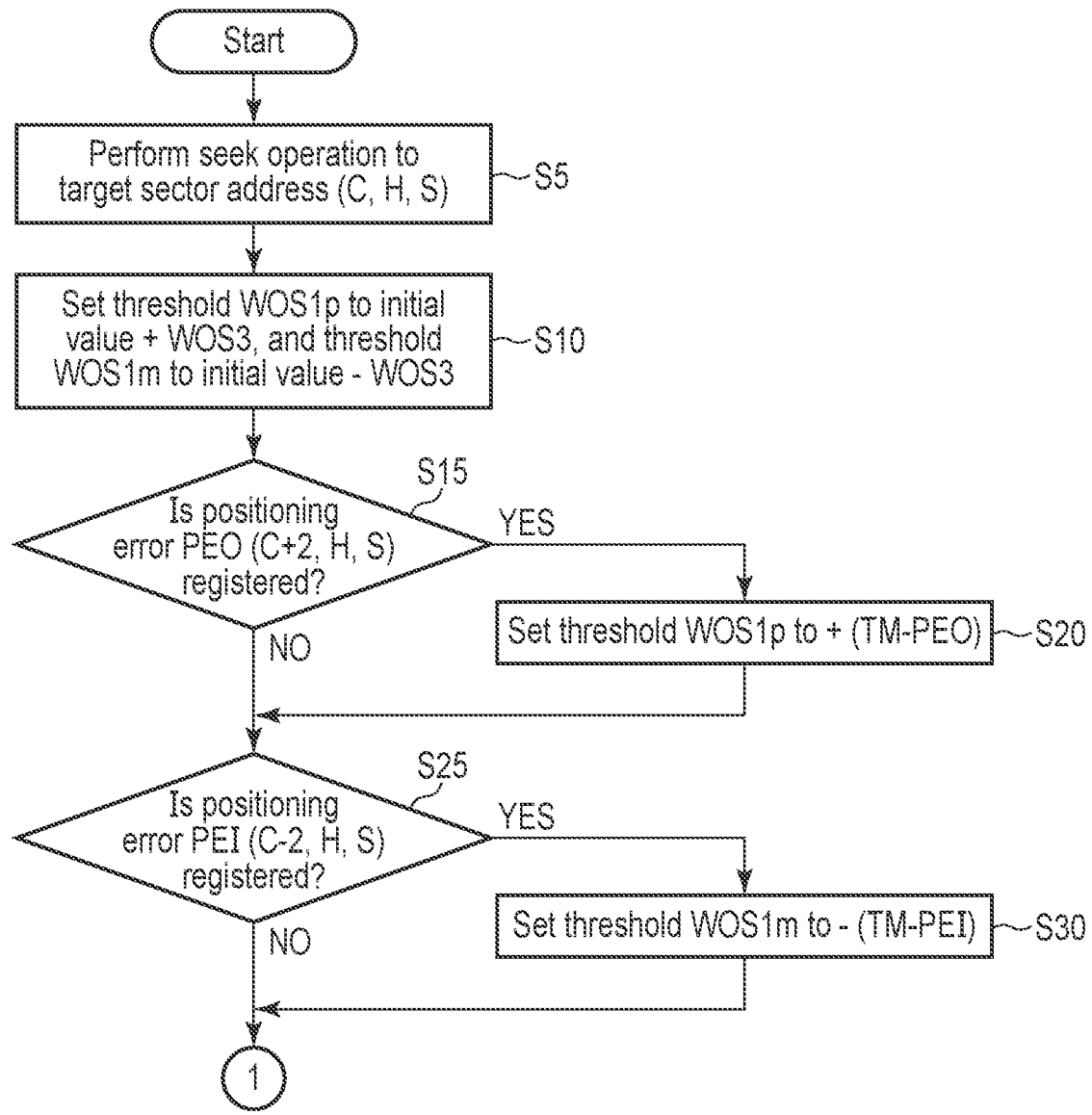
FIG. 11 is a flowchart illustrating write processing of the magnetic disk device according to the embodiment.

First, the determination of the write inhibit flag WINH and the write off-track thresholds WOS1$p$ and WOS1$m$ described with reference to FIGS. 8 and 9 will be described with reference to FIGS. 11 and 12. FIG. 11 is a flowchart illustrating write processing of the magnetic disk device according to the embodiment.

Figure 12:
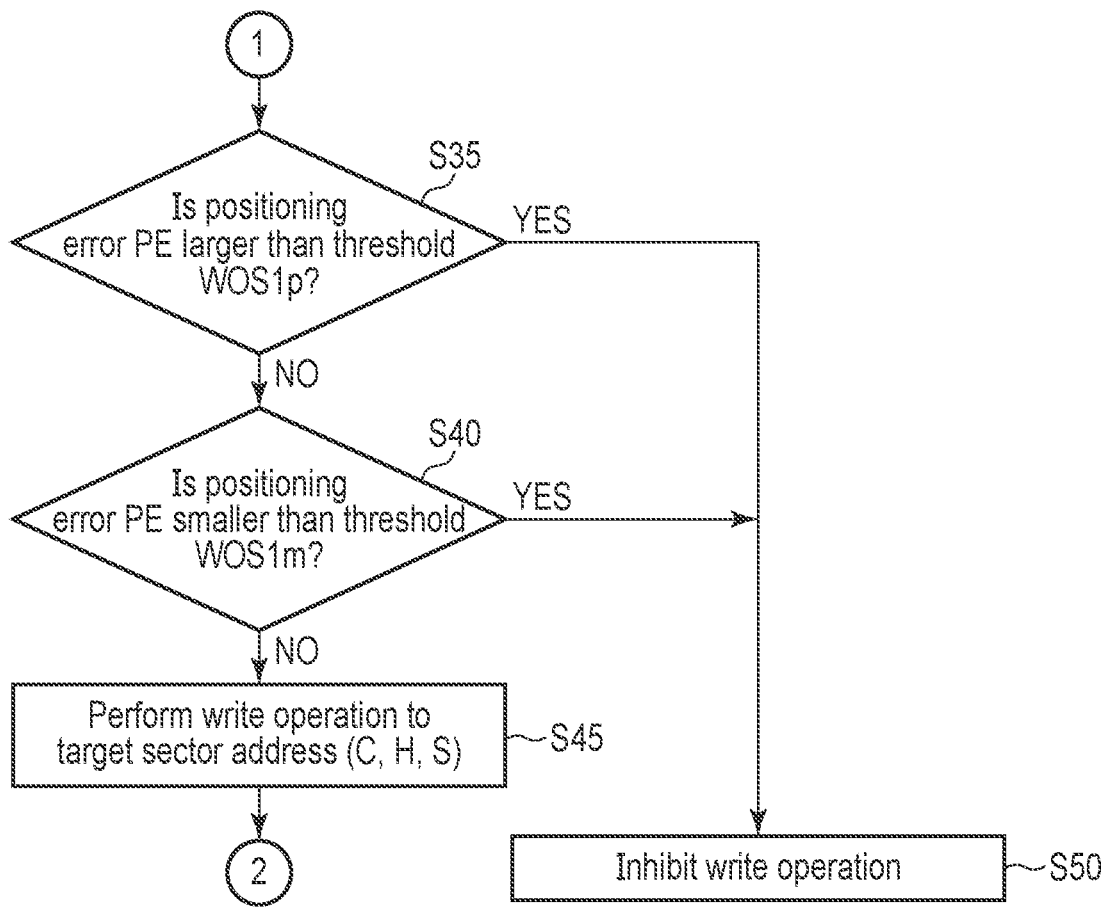
FIG. 12 is a flowchart illustrating the write processing of the magnetic disk device according to the embodiment subsequent to FIG. 11.

FIG. 12 is a flowchart illustrating the write processing of the magnetic disk device according to the embodiment subsequent to FIG. 11.

As illustrated in FIG. 11, when the write processing is started, in step S5, the system controller 130 performs a seek operation to the target sector address (C, H, S). Note that the seek operation is an operation of moving the head 15W to a target position (in one example, the target sector address (C, H, S)). Next, in step S10, the system controller 130 sets the write off-track threshold WOS1$p$ on the inner radial side to an initial value+WOS3, and sets the write off-track threshold WOS1$m$ on the outer radial side to an initial value−WOS3.

After setting the write off-track thresholds WOS1$p$ and WOS1$m$ in step S10, in step S15, the system controller 130 determines whether or not a positioning error PEO (C+2, H, S) in a sector (C+2, H, S) on the inner radial side of two tracks at the target position is registered. When it is determined in step S15 that the positioning error PEO (C+2, H, S) is not registered, the process proceeds to step S25.

On the other hand, when it is determined that the positioning error PEO (C+2, H, S) is registered (step S15), the process proceeds to step S20, and in step S20, the write off-track threshold WOS1$p$ is set to a value obtained by subtracting the positioning error PEO (C+2, H, S) from the TPI margin TM. The write off-track threshold WOS1$p$ is expressed by the following formula. Note that WOS1$p$ is a write off-track threshold, and PEO is a positioning error in the sector (C+2, H, S).

WOS1$p$=+(TM−PEO)

After setting the write off-track threshold WOS1$p$ in step S20, the process proceeds to step S25.

In step S25, the system controller 130 determines whether a positioning error PEI (C−2, H, S) in a sector (C−2, H, S) on the outer radial side of two tracks at the target position is registered. When it is determined in step S25 that the positioning error PEI (C−2, H, S) is not registered, the process proceeds to step S35. (See FIG. 12.)

On the other hand, when it is determined that the positioning error PEI (C−2, H, S) is registered (step S25), the process proceeds to step S30, and in step S30, the write off-track threshold WOS1$m$ is set to a value obtained by subtracting the positioning error PEI (C−2, H, S) from the TPI margin TM. The write off-track threshold WOS1$m$ is expressed by the following formula. Note that WOS1$m$ is a write off-track threshold, and PEI is a positioning error in the sector (C−2, H, S).

WOS1$m$=−(TM−PEI)

After setting the write off-track threshold WOS1$m$ in step S30, the process proceeds to step S35.

Subsequently, in step S35, the system controller 130 determines whether the positioning error PE in the target sector (C, H, S) is larger than the write off-track threshold WOS1$p$. When the positioning error PE is larger than the write off-track threshold WOS1$p$, the process proceeds to step S50, and the system controller 130 inhibits the write operation.

When the positioning error PE is smaller than the write off-track threshold WOS1$p$ (step S35), the process proceeds to step S40, and in step S40, the system controller 130 determines whether the positioning error PE is smaller than the write off-track threshold WOS1$m$. When the positioning error PE is smaller than the write off-track threshold WOS1$m$, the process proceeds to step S50, and the system controller 130 inhibits the write operation.

When the positioning error PE is larger than the write off-track threshold WOS1$m$ (step S40), the process proceeds to step S45 to perform the write operation.

Note that steps S15 and S20, and steps S25 and S30 can be interchanged. Referring to FIG. 11, after setting the write off-track thresholds WOS1$p$ and WOS1$m$ in step S10, step S25 may be performed, and step S15 may be performed when the positioning error PEI is not registered. Similarly, step S35 and step S40 may be interchanged.

Figure 13:
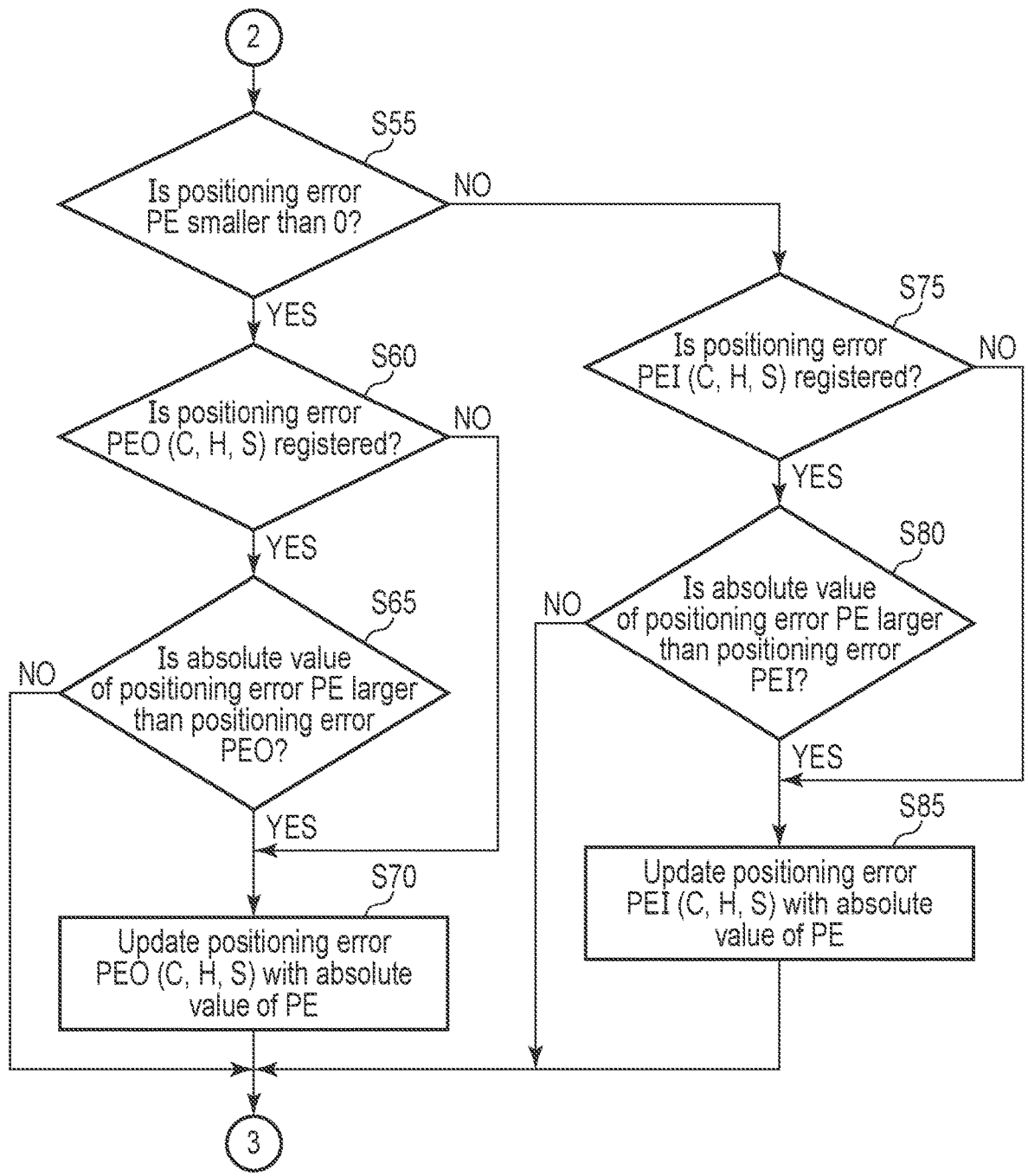
FIG. 13 is a flowchart illustrating the write processing of the magnetic disk device according to the embodiment subsequent to FIG. 12.

A procedure for registering the positioning error in the off-track write table 611 described with reference to FIG. 10 will be described with reference to FIG. 13. FIG. 13 is a flowchart illustrating the write processing of the magnetic disk device according to the embodiment subsequent to FIG. 12.

After the write operation is performed in step S45 (See FIG. 12), the process proceeds to step S55. In step S55, the system controller 130 determines whether the positioning error PE is smaller than 0. In a case where the positioning error PE is smaller than 0, the process proceeds to step S60.

In step S60, the system controller 130 determines whether the positioning error PEO (C, H, S) in the outer radial direction of the sector (C, H, S) is registered, and in a case where the positioning error PEO (C, H, S) is not registered, the process proceeds to step S70, and in step S70, the positioning error PEO (C, H, S) is registered with an absolute value of the positioning error PE.

In a case where the positioning error PEO (C, H, S) is registered in step S60, the process proceeds to step S65. In step S65, the system controller 130 determines whether the absolute value of the positioning error PE is larger than the registered positioning error PEO (C, H, S). In a case where the absolute value of the positioning error PE is not larger than the registered positioning error PEO (C, H, S), the process proceeds to step S95 (See step S95 in FIG. 15).

When the absolute value of the positioning error PE is larger than the registered positioning error PEO (C, H, S) (step S65), the process proceeds to step S70, and in step S70, the system controller 130 updates the positioning error PEO (C, H, S) with the absolute value of the positioning error PE. Thereafter, the process proceeds to step S95.

On the other hand, in a case where the positioning error PE is larger than 0 in step S55, the process proceeds to step S75, and in step S75, the system controller 130 determines whether the positioning error PEI (C, H, S) in the inner radial direction of the sector (C, H, S) is registered. When the positioning error PEI (C, H, S) is not registered, the process proceeds to step S85, and in step S85, the positioning error PEI (C, H, S) is registered as the absolute value of the positioning error PE.

In a case where the positioning error PEI (C, H, S) is registered in step S75, the process proceeds to step S80. In step S80, the system controller 130 determines whether the absolute value of the positioning error PE is larger than the registered positioning error PEI (C, H, S). In a case where the absolute value of the positioning error PE is not larger than the registered positioning error PEI (C, H, S), the process proceeds to step S95.

When the absolute value of the positioning error PE is larger than the registered positioning error PEI (C, H, S) (step S80), the process proceeds to step S85, and in step S85, the system controller 130 updates the positioning error PEI (C, H, S) with the absolute value of the positioning error PE. Thereafter, the process proceeds to step S95.

Although the registration of the positioning error in the off-track write table 611 has been described, it may be determined whether or not the positioning error is registered by adding the second threshold WOS2 described in FIG. 6. A specific example is illustrated in FIG. 14.

Figure 14:
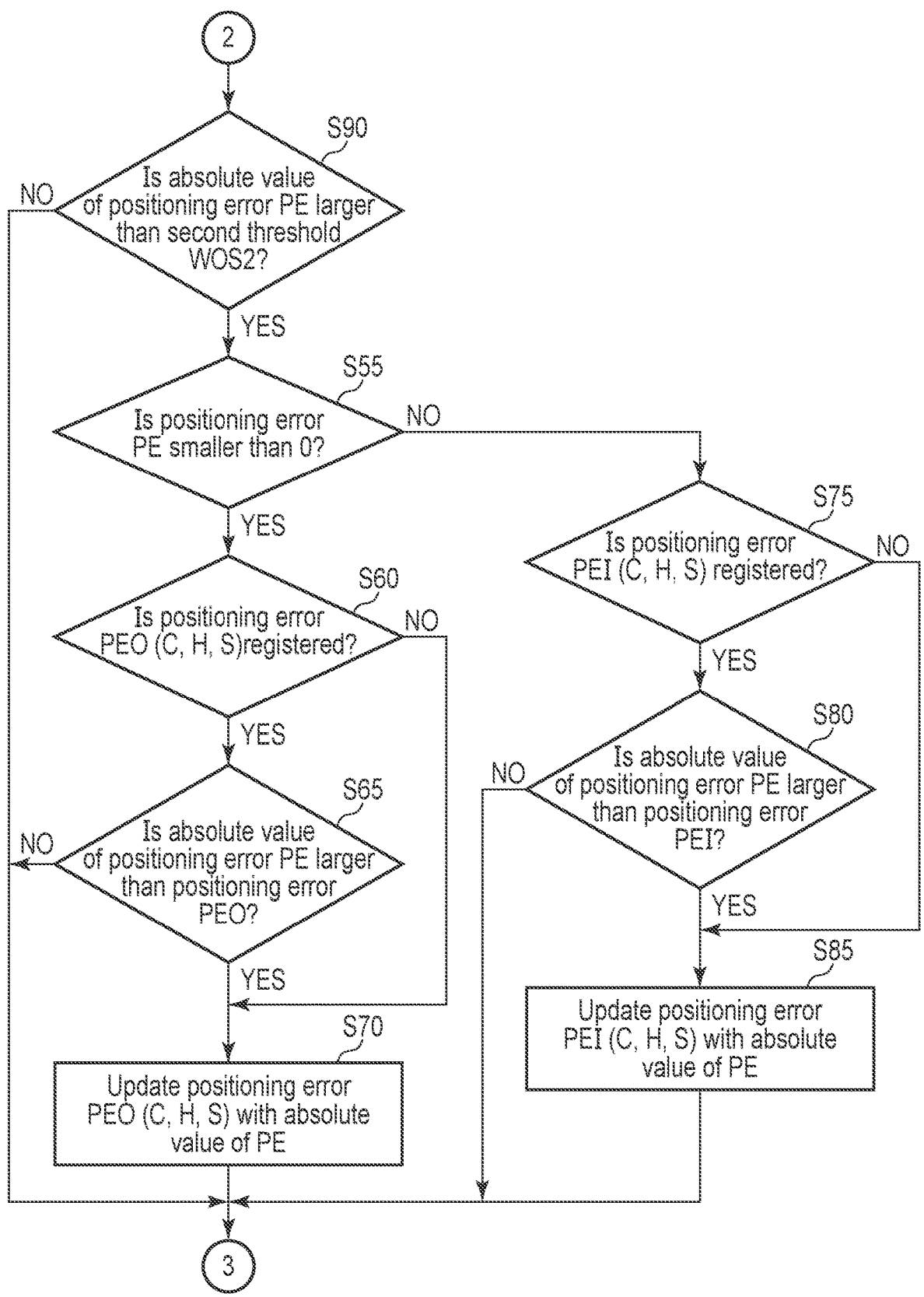
FIG. 14 is a flowchart illustrating the write processing of the magnetic disk device according to the embodiment subsequent to FIG. 12.

FIG. 14 is a flowchart illustrating the write processing of the magnetic disk device according to the embodiment subsequent to FIG. 12.

As illustrated in FIG. 14, after the write operation is performed in step S45 (See FIG. 12), the process proceeds to step S90, and in step S90, the system controller 130 determines whether the absolute value of the positioning error PE is larger than the second threshold WOS2. When the absolute value of the positioning error PE is larger than the second threshold WOS2, the processing from step S55 to step S70 or from step S55 to step S85 described in FIG. 13 is performed.

When the absolute value of the positioning error PE is smaller than the second threshold WOS2, the process proceeds to step S95.

Figures 15, 16:
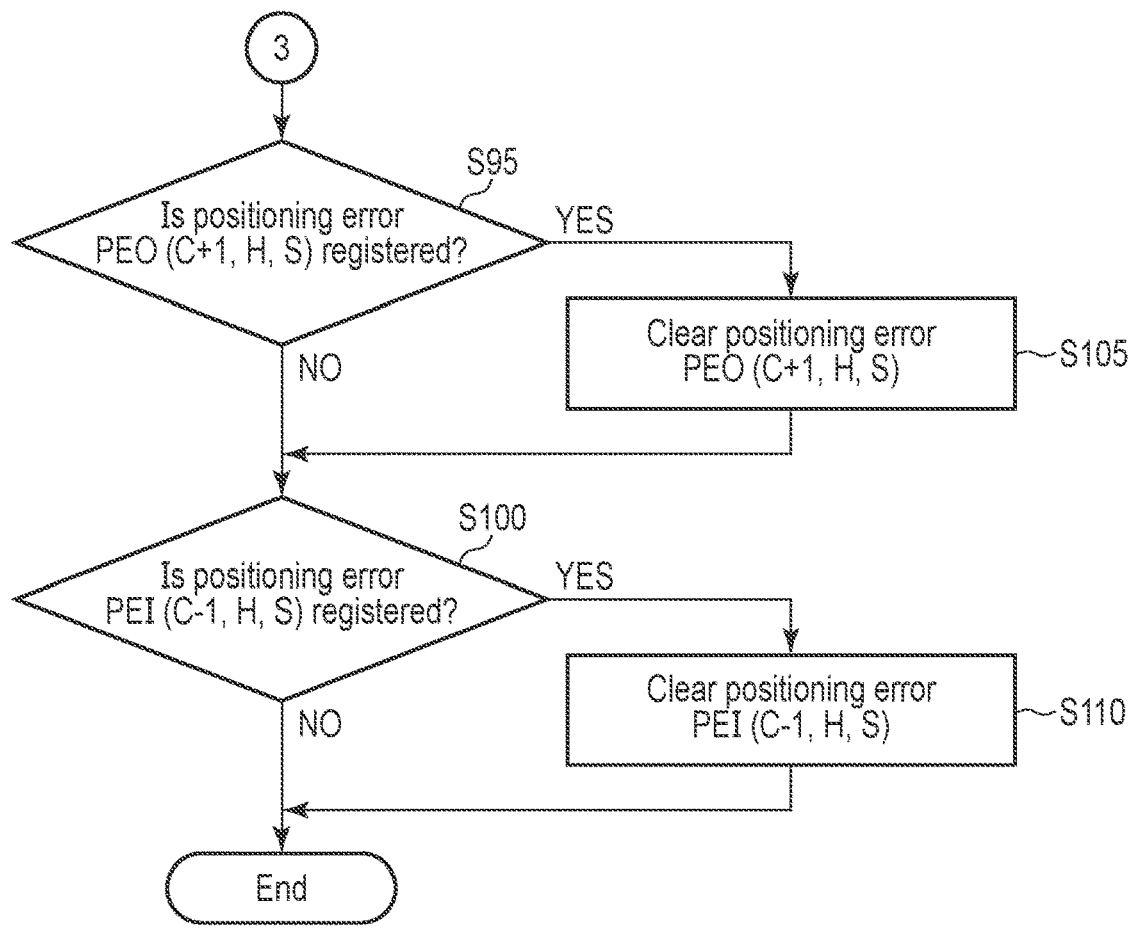
FIG. 15 is a flowchart illustrating the write processing of the magnetic disk device according to the embodiment subsequent to FIG. 13 or 14.
FIG. 16 is a diagram illustrating an example of an off-track write table of the magnetic disk device according to the embodiment.

Next, a procedure for releasing registration information in the off-track write table 611 will be described. FIG. 15 is a flowchart illustrating the write processing of the magnetic disk device according to the embodiment subsequent to FIG. 13 or 14. FIG. 15 illustrates a procedure for releasing the information registered in the off-track write table 611.

As illustrated in FIG. 15, in step S95, the system controller 130 determines whether a positioning error PEO (C+1, H, S) in the outer radial direction of a sector (C+1, H, S) located on the inner radial side of one track of the sector (C, H, S) in which the write operation has been performed is registered. In a case where the positioning error PEO (C+1, H, S) is registered, the process proceeds to step S105, and in step S105, the positioning error PEO (C+1, H, S) is cleared. The above-described "clear" means that "set a value of the positioning error PEO (C+1, H, S) to 0". Thereafter, the process proceeds to step S100.

When the positioning error PEO (C+1, H, S) is not registered (step S95), the process proceeds to step S100.

In step S100, the system controller 130 determines whether a positioning error PEI (C−1, H, S) in the inner radial direction of a sector (C−1, H, S) located on the outer radial side of one track of the sector (C, H, S) in which the write operation has been performed is registered. In a case where the positioning error PEI (C−1, H, S) is registered, the process proceeds to step S110, and in step S110, the positioning error PEI (C−1, H, S) is cleared. Thereafter, the write processing to the target position is ended.

That is, the process of releasing the registration information is a process of releasing the registration of the positioning error in each of the sector (C+1, H, S) and the sector (C−1, H, S) adjacent to the sector (C, H, S), toward the sector (C, H, S), when data is written thereto.

Here, the entry of the off-track write table 611 will be described.

FIG. 16 is a diagram illustrating an example of the off-track write table 611 of the magnetic disk device according to the embodiment. One entry includes the cylinder number C, the head number H, the sector number S, the positioning error PEI in the inner radial direction, and the positioning error PEO in the outer radial direction of the track. In one example, a serial number is assigned to the entry, and 2401 sectors are entered. Here, "entered" means that "information is registered". Furthermore, in one example, 10,000 is set as an upper limit of the number (Hereinafter, it is referred to as the number of entries.) that can be entered, but information of all sectors may be stored in the off-track write table 611 as long as the storage capacity is allowable. In a case where an upper limit is set for the number of entries, a registration release process is performed on information of unnecessary sectors.

Hereinafter, the registration release process will be described in detail.

Specifically, the registration release process is performed in a case where the registered sector does not affect an adjacent track, and is performed on the information of the registered sector in which the adjacent track is overwritten.

When a sector located on the inner radial side of one track of the registered sector is overwritten, the positioning error PEI of the registered sector is cleared. That is, the positioning error PEI is set to 0. When a sector located on the outer radial side of one track of the registered sector is overwritten, the positioning error PEO of the registered sector is cleared. That is, the positioning error PEO is set to 0.

When both the positioning error PEI and the positioning error PEO of the registered sector become 0, the registration release process is performed on the information of the registered sector. As a result, the entry of the registered sector is released.

Hereinafter, a procedure of the registration release process will be described.

Figure 17:
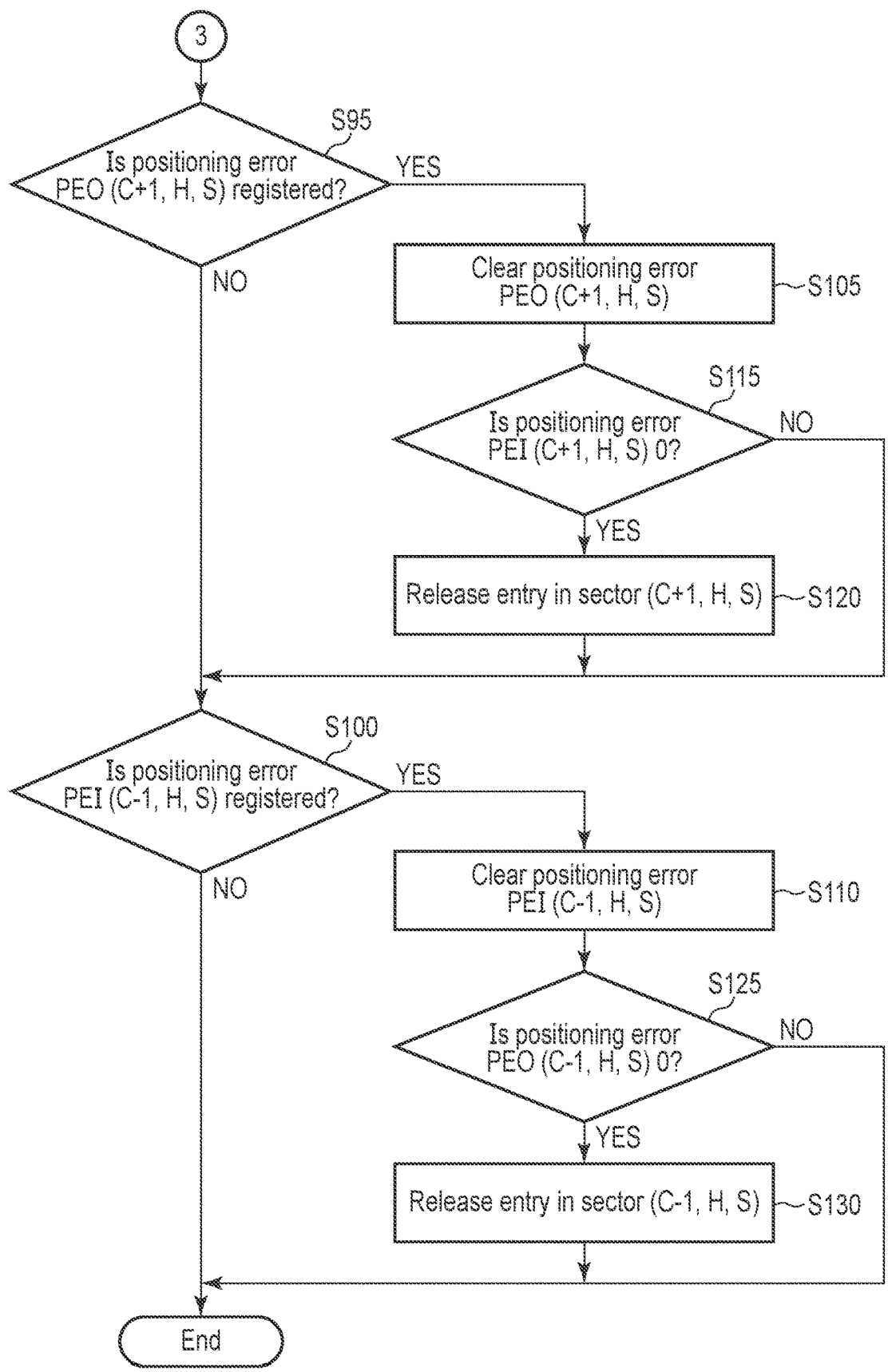
FIG. 17 is a flowchart illustrating the write processing of the magnetic disk device according to the embodiment subsequent to FIG. 13 or 14.

FIG. 17 is a flowchart illustrating the write processing of the magnetic disk device according to the embodiment subsequent to FIG. 13 or 14. Note that step S95, step S100, step S105, and step S110 are the same processes as those described in FIG. 15, and thus are omitted.

As illustrated in FIG. 17, after the positioning error PEO (C+1, H, S) in the outer radial direction of the sector (C+1, H, S) is cleared in step S105, the process proceeds to step S115. In step S115, the system controller 130 determines whether the positioning error PEI (C+1, H, S) in the inner radial direction of the sector (C+1, H, S) is 0, and when the positioning error PEI (C+1, H, S) is not 0, the process proceeds to step S100.

When the positioning error PEI (C+1, H, S) is 0 (step S115), the process proceeds to step S120, and in step S120, the system controller 130 releases the entry in the sector (C+1, H, S). Thereafter, the process proceeds to step S100.

In step S110, the positioning error PEI (C−1, H, S) in the inner radial direction of the sector (C−1, H, S) is cleared, and then the process proceeds to step S125. In step S125, the system controller 130 determines whether the positioning error PEO (C−1, H, S) in the outer radial direction of the sector (C−1, H, S) is 0, and ends the write processing to the target position when the positioning error PEO (C−1, H, S) is not 0.

When the positioning error PEO (C−1, H, S) is 0 (step S125), the process proceeds to step S130, and in step S130, the system controller 130 releases the entry in the sector (C−1, H, S). Thereafter, the write processing to the target position is ended.

Next, effects in a case where the above-described write processing is applied will be described.

FIG. 18 is a graph illustrating an effect of the magnetic disk device according to the embodiment. In FIG. 18, a horizontal axis represents a TPI gain, and represents a ratio to a predetermined track density realized by reducing a required value of the TPI margin TM and narrowing the track pitch TP. A vertical axis is a performance index, and represents a ratio of the number of random writes per hour under a vibration environment (Specifically, the positioning error 3σ value is 6.1 nm.) to a desk environment. A broken line indicates a case where the write off-track threshold is uniformly narrowed as in the related art, and a solid line indicates a case where the write off-track threshold is dynamically narrowed on the basis of write positioning information two tracks ahead.

As illustrated in FIG. 18, a performance improvement effect is exhibited when the TPI gain is up to 1.25 times the predetermined value. For example, in a case where the performance index under a vibration environment is 0.9, the TPI gain indicated by the broken line is about 1.1 times, and the TPI gain indicated by the solid line is about 1.25 times. Thus, it is understood that the potential of 1.13 times is obtained by dividing 1.25 by 1.1.

According to the magnetic disk device 1 configured as described above, the magnetic disk device 1 includes the magnetic disk 10, the magnetic head 15, and the controller 130. The controller 130 determines whether or not the positioning errors PEI and PEO are registered in a sector two tracks ahead of the sector to be written, sets the first threshold WOS1 based on the positioning errors PEI and PEO in a case where the positioning errors PEI and PEO are registered, and determines whether or not to perform the write operation based on the first threshold WOS1 and the positioning error PE of the sector to be written.

The controller 130 registers both the positioning error PEI in the inner radial direction and the positioning error PEO in the outer radial direction.

The controller 130 determines whether or not to register the positioning errors PEI and PEO based on the positioning error PE of the sector to be written and the second threshold WOS2 for determining registration.

The first threshold WOS1 is a value obtained by subtracting the positioning errors PEI and PEO registered in the sector two tracks ahead of the sector to be written from a predetermined TPI margin.

As a result, even if the write off-track thresholds WOS1$p$ and WOS1$m$ are not uniformly narrowed, the track width TW can be maintained at the track width TW0 or more, and it is possible to obtain a magnetic disk device capable of suppressing a write error, a retry operation, and the like due to the threshold excess of the positioning error PE while maintaining the read quality and improving the write performance.

The controller 130 may release the registration of the positioning errors PEI and PEO registered in the sector adjacent to the written sector. As a result, the off-track write table 611 having an upper limit on the number of entries can be supported.

When the positioning errors PEI and PEO are not registered in the sector two tracks ahead of the sector to be written, the controller 130 determines whether or not to perform the write operation based on the positioning error PE of the sector to be written and the constant static third threshold WOS3.

The third threshold WOS3 is a magnitude between half of the TPI margin and the TPI margin. As a result, it is possible to prevent the dynamic write off-track thresholds WOS1$p$ and WOS1$m$ from being extremely relaxed.

Another Embodiment

Next, a magnetic disk device 1 according to another embodiment will be described. Note that the magnetic disk device 1 is similar to that of the above embodiment except that it is described in another embodiment.

First, write processing of the magnetic disk device 1 will be described. In the above embodiment and another embodiment, the definition of the first threshold is different, and the procedure of writing and the like are the same. Therefore, a first threshold WOS12 in another embodiment will be described in detail.

In the above embodiment, the first threshold WOS1 illustrated in FIG. 3 is expressed by Formula (3), and the second threshold WOS2 illustrated in FIG. 6 is expressed by Formula (5). The first threshold WOS1 in the above embodiment can be expressed by the following formulas from Formulas (3) and (5).

$$WOS1 = WOS3 - (PEO - WOS2)$$

The first threshold WOS12 in another embodiment can be expressed by the following formula obtained by multiplying a difference (PEO−WOS2) between a positioning error PEO and a second threshold WOS2 expressed by the above formula by a predetermined gain GAIN. Note that WOS12 indicates the first threshold in another embodiment, and GAIN indicates the predetermined gain.

$$WOS12 = WOS3 - GAIN \times (PEO - WOS2)$$

Here, the first threshold WOS12 is expressed by Formula (6) described below from the above formula and Formula (5).

$$WOS12 = TM + G0 - GAIN \times PEO \qquad (6)$$

Note that G0 is a constant represented by the following formula and is a predetermined amount.

$$G0 = (GAIN - 1) \times WOS2$$

Furthermore, in consideration of Formula (3), Formula (6) can be transformed into the following Formula.

$$WOS12 = WOS1 + (1 - GAIN) \times (PEO - WOS2)$$

From the above formula, when the positioning error PEO is larger than the second threshold WOS2 and the gain GAIN is larger than 1, the first threshold WOS12 for the positioning error PEI to be written from now on is smaller than the first threshold WOS1 in the above embodiment. Further, as described above, the gain GAIN is a value of 1 or more, for example, 1.5 or 2.

On the other hand, the first threshold WOS1 in the above embodiment illustrated in FIG. 4 can be expressed by the following formulas from Formulas (4) and (5).

$$WOS1=WOS3-(PEI-WOS2)$$

The first threshold WOS12 in another embodiment can be expressed by the following formula obtained by multiplying the difference (PEI−WOS2) between the positioning error PEI and the second threshold WOS2 expressed by the above formula by the predetermined gain GAIN.

$$WOS12=WOS1+GAIN(PEI-WOS2)$$

Here, the first threshold WOS12 is expressed by Formula (7) described below from the above formula and Formula (5).

$$WOS12=TM+G0-GAIN\times PEI \quad (7)$$

Furthermore, in consideration of Formula (3), Formula (7) can be transformed into the following formula.

$$WOS12=WOS1+(1-GAIN)\times(PEI-WOS2)$$

From the above formula, when the positioning error PEI is larger than the second threshold WOS2 and the gain GAIN is larger than 1, the first threshold WOS12 for the positioning error PEO to be written is smaller than the first threshold WOS1 in the above embodiment. Further, as described above, the gain GAIN is a value of 1 or more, for example, 1.5 or 2.

Figure 19:
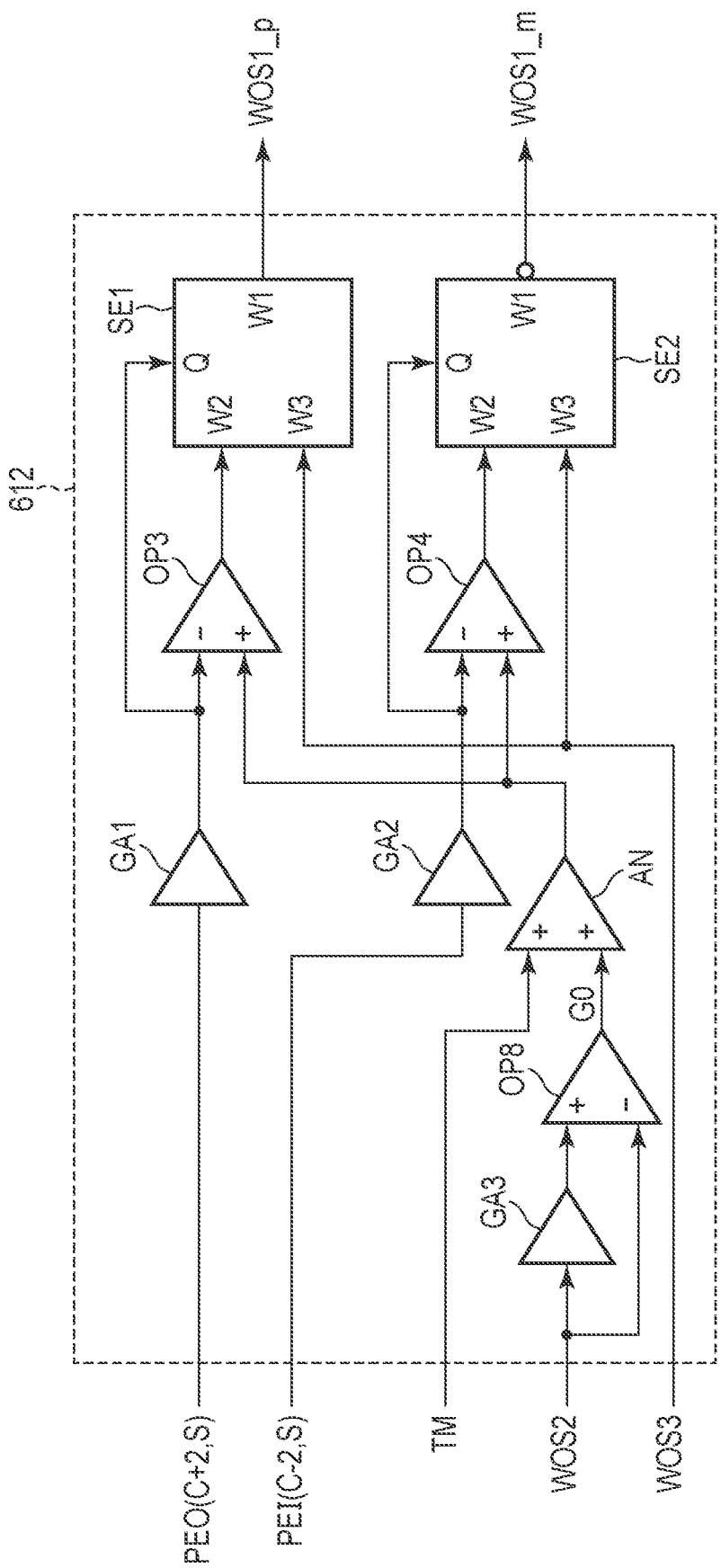
FIG. 19 is a block diagram illustrating a tightening processing circuit of a magnetic disk device according to another embodiment.

Next, a tightening processing circuit 612 of the magnetic disk device 1 according to another embodiment will be described. FIG. 19 is a block diagram illustrating the tightening processing circuit 612 of the magnetic disk device 1 according to another embodiment. As illustrated in FIG. 19, the tightening processing circuit 612 further includes gain amplifiers GA1, GA2, and GA3, an operational amplifier OP8, and an amplifier AN.

The gain amplifier GA1 outputs a value (Hereinafter, also referred to as "product of positioning error PEO (C+2, S) and gain GAIN") obtained by multiplying the input positioning error PEO (C+2, S) by the gain GAIN to an operational amplifier OP3 and a selector SE1. The gain amplifier GA2 outputs a value (Hereinafter, also referred to as "product of positioning error PEI (C−2, S) and gain GAIN") obtained by multiplying the input positioning error PEI (C−2, S) by the gain GAIN to an operational amplifier OP4 and a selector SE2. The gain amplifier GA3 outputs a value obtained by multiplying the input second threshold WOS2 by the gain GAIN to the operational amplifier OP8. The operational amplifier OP8 outputs a value (predetermined amount G0) obtained by subtracting the second threshold WOS2 from the value input from the gain amplifier GA3 to the amplifier AN. The amplifier AN outputs a value obtained by adding the predetermined amount G0 to a TPI margin TM to the operational amplifier OP3 and the operational amplifier OP4.

A terminal Q of the selector SE1 receives an input indicating whether or not the product of the positioning error PEO (C+2, S) and the gain GAIN is zero. The selector SE1 outputs the value input to a terminal W1 when the value input from the terminal Q is zero, and outputs the value input to a terminal W2 when the value input from the terminal Q is other than zero.

A terminal Q of the selector SE2 receives an input indicating whether or not the product of the positioning error PEI (C−2, S) and the gain GAIN is zero. The selector SE2 outputs the value input to a terminal W1 when the value input from the terminal Q is zero, and outputs the value input to a terminal W2 when the value input from the terminal Q is other than zero.

A static third threshold WOS3 is input to a terminal W3. The terminal W2 receives a value obtained by subtracting a value obtained by multiplying the positioning error PEO (C+2, S) by the gain GAIN from the sum of the TPI margin TM and the predetermined amount G0, or a value obtained by subtracting a value obtained by multiplying the positioning error PEI (C−2, S) by the gain GAIN from the sum of the TPI margin TM and the predetermined amount G0.

Figure 20:
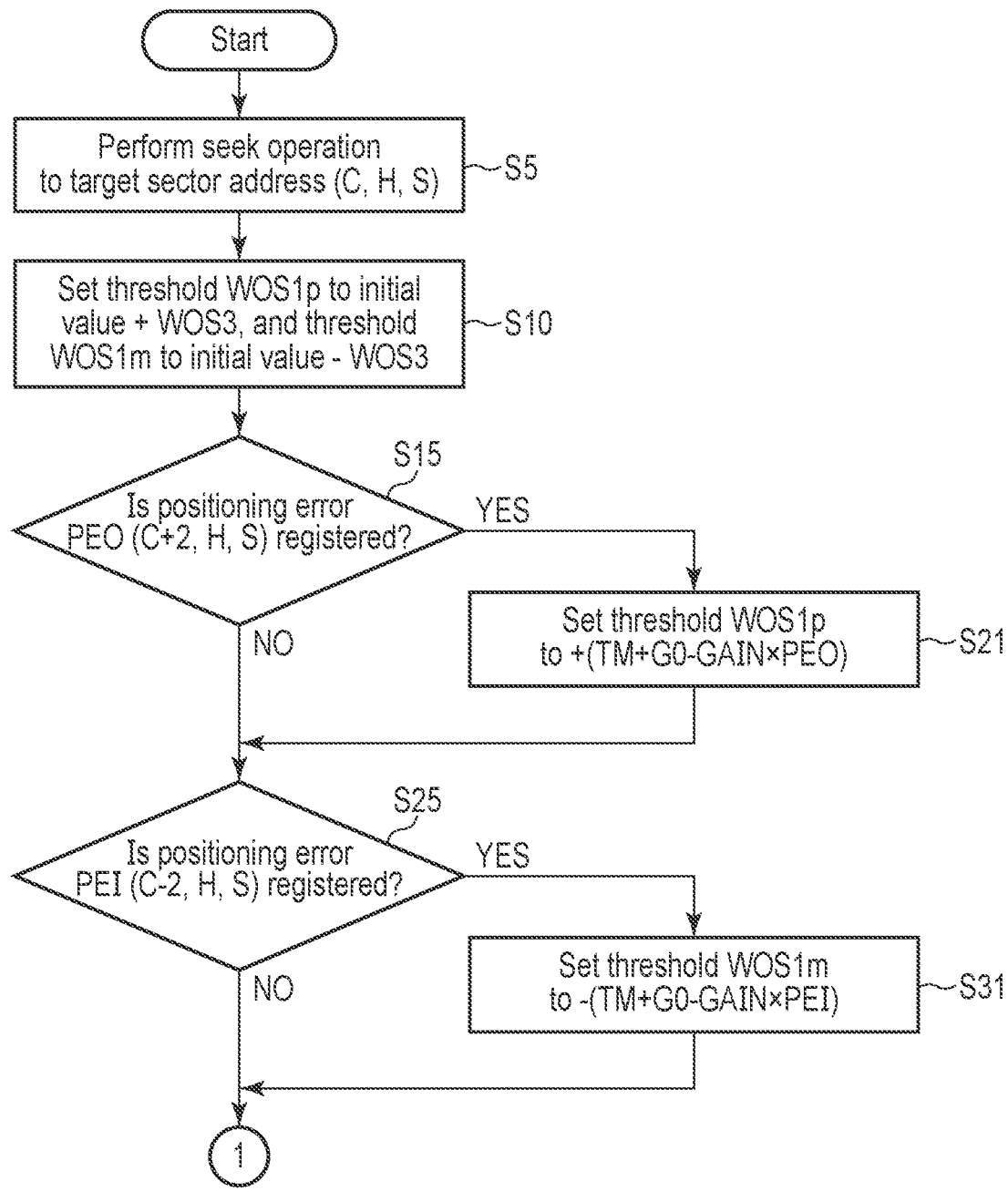
FIG. 20 is a flowchart illustrating write processing of the magnetic disk device according to another embodiment.

Next, a procedure for determining write off-track thresholds WOS1$p$ and WOS1$m$ of the magnetic disk device 1 according to another embodiment will be described. FIG. 20 is a flowchart illustrating write processing of the magnetic disk device 1 according to another embodiment. Note that since steps other than step S21 and step S31 are the same as those in the above embodiment, only step S21 and step S31 will be described.

As illustrated in FIG. 20, in a case where it is determined in step S15 that the positioning error PEO (C+2, H, S) is registered, the process proceeds to step S21, and in step S21, the system controller 130 sets the write off-track threshold WOS1$p$ to a value obtained by adding the predetermined amount G0 to the TPI margin TM and subtracting the product of the positioning error PEO (C+2, H, S) and the gain GAIN. The write off-track threshold WOS1$p$ is expressed by the following formula. Note that WOS1$p$ is a write off-track threshold, and PEO is a positioning error in the sector (C+2, H, S).

$$WOS1p=+(TM+G0-GAIN\times PEO)$$

After setting the write off-track threshold WOS1$p$ in step S21, the process proceeds to step S25.

In a case where it is determined in step S25 that the positioning error PEI (C−2, H, S) is registered, the process proceeds to step S31, and in step S31, the system controller 130 sets the write off-track threshold WOS1$m$ to a value obtained by adding the predetermined amount G0 to the TPI margin TM and subtracting the product of the positioning error PEI (C−2, H, S) and the gain GAIN. The write off-track threshold WOS1$m$ is expressed by the following formula. Note that WOS1$m$ is a write off-track threshold, and PEI is a positioning error in the sector (C−2, H, S).

$$WOS1m=-(TM+G0-GAIN\times PEI)$$

After setting the write off-track threshold WOS1$m$ in step S31, the process proceeds to step S35.

Hereinafter, effects of the magnetic disk device 1 according to another embodiment will be described. According to the magnetic disk device 1 configured as described above, the first threshold WOS12 is a value obtained by adding the predetermined amount G0 to the predetermined TPI margin TM and subtracting the product of the predetermined gain GAIN and the positioning error PEI or PEO registered in the sector two tracks ahead of a sector to be written. At this time, the gain GAIN is a value of 1 or more.

Further, the predetermined amount G0 is a product of a value obtained by subtracting 1 from the predetermined gain GAIN and the second threshold WOS2. As a result, since the positioning error PEI and the positioning error PEO can be reduced, a sufficient track width TW can be secured even when the track pitch TP is reduced (see Formula (1)). For the above reason, it is possible to obtain the magnetic disk device 1 in which a recording density is improved.

Modification Example

A modification example of the magnetic disk device 1 according to another embodiment will be described. Note that the magnetic disk device 1 is similar to the another embodiment except for being described in the present modification example.

In the above embodiment, the first threshold WOS1 illustrated in FIG. 3 is expressed by Formula (3). A first threshold WOS13 in the modification example can be expressed by the following Formula (8) obtained by multiplying the positioning error PEO of Formula (3) by the predetermined gain GAIN. Note that WOS13 indicates a first threshold in the modification example.

$$WOS13=TM-GAIN \times PEO \quad (8)$$

Formula (8) can be transformed into the following formula in consideration of Formula (3).

$$WOS13=WOS1+(1-GAIN) \times PEO$$

When the gain GAIN is larger than 1 from the above formula, the first threshold WOS13 for the positioning error PEI to be written is smaller than the first threshold WOS1 in the above embodiment. As described above, the gain GAIN is a value of 1 or more.

On the other hand, in the above embodiment, the first threshold WOS1 illustrated in FIG. 4 is expressed by Formula (4). The first threshold WOS13 in the modification example can be expressed by the following Formula (9) obtained by multiplying the positioning error PEI of Formula (4) by the predetermined gain GAIN.

$$WOS13=TM-GAIN \times PEI \quad (9)$$

Formula (9) can be transformed into the following formula in consideration of Formula (4).

$$WOS13=WOS1+(1-GAIN) \times PEI$$

When the gain GAIN is larger than 1 from the above formula, the first threshold WOS13 for the positioning error PEO to be written is smaller than the first threshold WOS1 in the above embodiment. From the above, the gain GAIN is a value of 1 or more.

Next, a tightening processing circuit 612 in the modification example of the magnetic disk device 1 according to another embodiment will be described. FIG. 21 is a block diagram illustrating the tightening processing circuit 612 in the modification example of the magnetic disk device 1 according to another embodiment.

As illustrated in FIG. 21, the tightening processing circuit 612 is configured without the gain amplifier GA3, the operational amplifier OP8, and the amplifier AP.

A static third threshold WOS3 is input to a terminal W3. A value obtained by subtracting the product of the positioning error PEO (C+2, S) and the gain GAIN from the TPI margin TM or a value obtained by subtracting the product of the positioning error PEI (C−2, S) and the gain GAIN from the TPI margin TM is input to a terminal W2.

Figure 22:
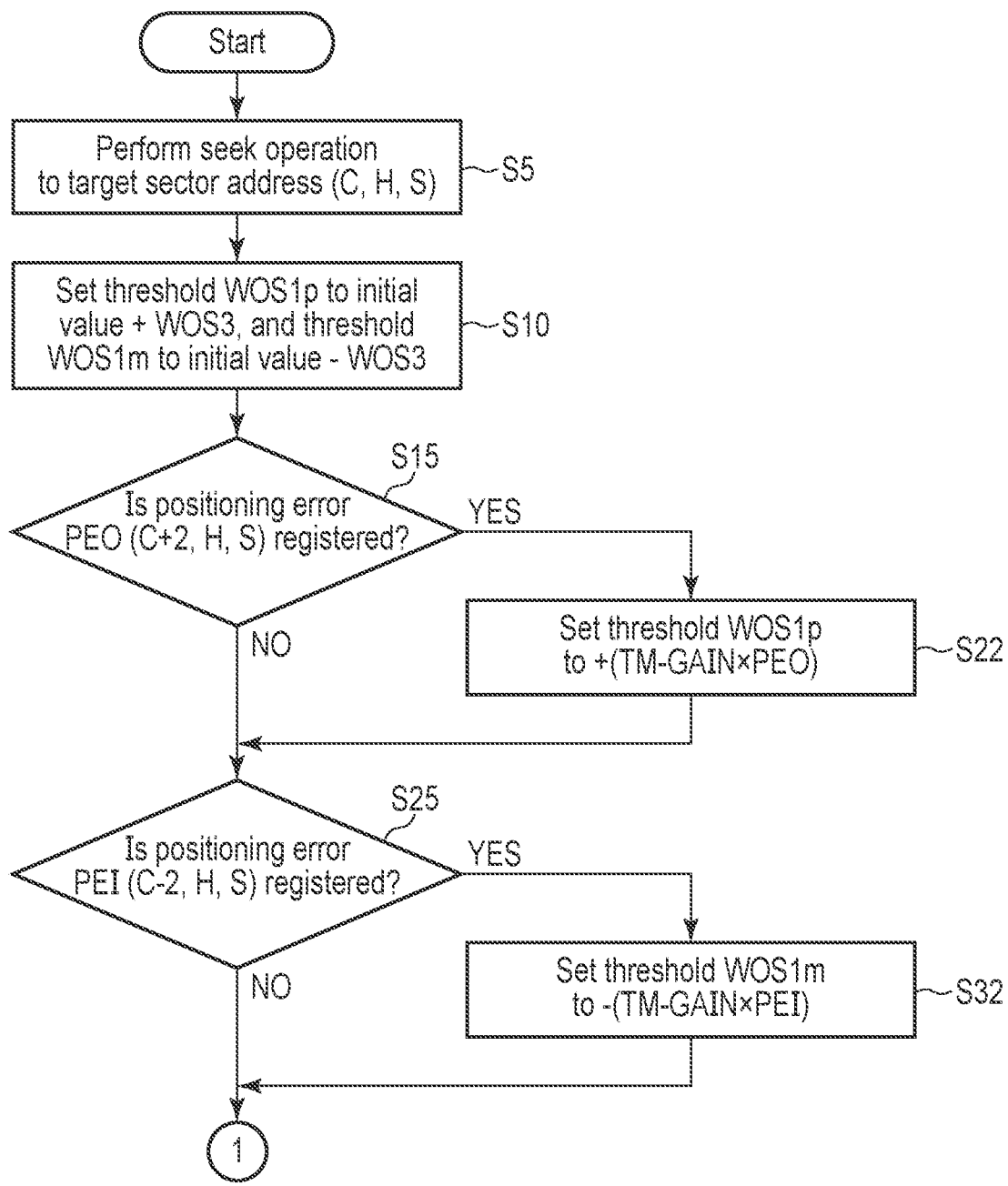
FIG. 22 is a flowchart illustrating write processing in a modification example of the magnetic disk device according to another embodiment.

Next, a procedure of determining the write off-track thresholds WOS1$p$ and WOS1$m$ in the modification example of the magnetic disk device 1 according to another embodiment will be described. FIG. 22 is a flowchart illustrating write processing in the modification example of the magnetic disk device 1 according to another embodiment. Note that except for steps S22 and S32, only steps S22 and S32 will be described because the processing is the same as in another embodiment.

As illustrated in FIG. 22, in a case where it is determined in step S15 that the positioning error PEO (C+2, H, S) is registered, the process proceeds to step S22, and in step S22, the system controller 130 sets the write off-track threshold WOS1$p$ to a value obtained by subtracting the product of the positioning error PEO (C+2, H, S) and the gain GAIN from the TPI margin TM. The write off-track threshold WOS1$p$ is expressed by the following formula. Note that WOS1$p$ is a write off-track threshold, and PEO is a positioning error in the sector (C+2, H, S).

$$WOS1p=+(TM-GAIN \times PEO)$$

After setting the write off-track threshold WOS1$p$ in step S22, the process proceeds to step S25.

In a case where it is determined in step S25 that the positioning error PEI (C−2, H, S) is registered, the process proceeds to step S32, and in step S32, the system controller 130 sets the write off-track threshold WOS1$m$ to a value obtained by subtracting the product of the positioning error PEI (C−2, H, S) and the gain GAIN from the TPI margin TM. The write off-track threshold WOS1$m$ is expressed by the following formula. Note that WOS1$m$ is a write off-track threshold, and PEI is a positioning error in the sector (C−2, H, S).

$$WOS1m=-(TM-GAIN \times PEI)$$

After setting the write off-track threshold WOS1$m$ in step S32, the process proceeds to step S35.

According to the magnetic disk device 1 configured as described above, the first threshold WOS13 is a value obtained by subtracting the product of the predetermined gain GAIN and the positioning error PEI or PEO registered in the sector two tracks ahead of a sector to be written from the predetermined TPI margin TM. As a result, the same effects as those of another embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head that is positioned on a track having a predetermined track pitch of the magnetic disk, writes data to the track of the magnetic disk, and reads data from the track of the magnetic disk; and
   a controller that controls positioning of the magnetic head, and registers an address of a sector of the track in which the data is written and a positioning error of the magnetic head with respect to the track at the address, determines whether or not a positioning error of a second sector that is two tracks ahead in a radial direction of a first sector to which the data is written is registered, and when the positioning error of the second sector is registered, sets a first threshold that allows a write operation for a positioning error of the first sector based on the positioning error of the second sector, and determines whether or not the positioning error of the first sector exceeds the first threshold, and stops the write operation when the positioning error of the first sector exceeds the first threshold.

2. The magnetic disk device according to claim 1, wherein the controller registers both a positioning error in an inner radial direction and a positioning error in an outer radial direction.

3. The magnetic disk device according to claim 1, wherein the controller sets a second threshold configured to determine registration of the positioning error of the first sector, and determines whether or not the positioning error of the first sector exceeds the second threshold, and registers the positioning error of the first sector when the positioning error of the first sector exceeds the second threshold.

4. The magnetic disk device according to claim 2, wherein the controller sets a second threshold configured to determine registration of the positioning error of the first sector, determines whether or not the positioning error of the first sector exceeds the second threshold, determines presence or absence of a registered positioning error in the first sector, determines whether or not directions of the positioning error of the first sector and the registered positioning error match in either the radial inner direction or the outer radial direction, determines whether or not an absolute value of the positioning error of the first sector is larger than the registered positioning error, and registers the positioning error of the first sector when the positioning error of the first sector exceeds the second threshold, and the registered positioning error in the first sector exists, and the directions of the positioning error of the first sector and the registered positioning error match, and the absolute value of the positioning error of the first sector is larger than the registered positioning error.

5. The magnetic disk device according to claim 1, wherein the controller determines whether or not a positioning error of a third sector adjacent to the first sector in the radial direction is registered, determines whether or not a direction of the positioning error of the third sector is a direction toward the first sector, and releases registration of the positioning error of the third sector when the positioning error of the third sector is registered and the direction of the positioning error of the third sector is the direction toward the first sector.

6. The magnetic disk device according to claim 1, wherein the first threshold is a value obtained by subtracting the positioning error of the second sector from a predetermined track pitch narrowing margin.

7. The magnetic disk device according to claim 5, wherein the first threshold is a value obtained by subtracting the positioning error of the second sector from a predetermined track pitch narrowing margin, and the predetermined track pitch narrowing margin is a sum of the positioning error of the first sector and the positioning error of the second sector in which a track width of the third sector sandwiched between the first sector and the second sector becomes a lower limit for reading by writing the first sector and the second sector.

8. The magnetic disk device according to claim 6, wherein the controller sets a third threshold that allows the write operation for the positioning error of the first sector when the positioning error of the second sector is not registered, determines whether or not the positioning error of the first sector exceeds the third threshold, and stops the write operation when the positioning error of the first sector exceeds the third threshold.

9. The magnetic disk device according to claim 8, wherein a range of the third threshold is from a half of the track pitch narrowing margin to the track pitch narrowing margin.

10. The magnetic disk device according to claim 3, wherein the first threshold is a value obtained by adding a predetermined amount to a predetermined track pitch narrowing margin and subtracting a product of a predetermined gain and the positioning error of the second sector.

11. The magnetic disk device according to claim 10, wherein the predetermined amount is a product of a value obtained by subtracting 1 from the predetermined gain and the second threshold.

12. The magnetic disk device according to claim 1, wherein the first threshold is a value obtained by subtracting a product of a predetermined gain and the positioning error of the second sector from a predetermined track pitch narrowing margin.

13. The magnetic disk device according to claim 10, wherein the predetermined gain has a value of 1 or more.

14. The magnetic disk device according to claim 12, wherein the predetermined gain has a value of 1 or more.

* * * * *